US010762802B2

(12) United States Patent
Wallace et al.

(10) Patent No.: US 10,762,802 B2
(45) Date of Patent: *Sep. 1, 2020

(54) WELDING SIMULATOR

(71) Applicant: LINCOLN GLOBAL, INC., City of Industry, CA (US)

(72) Inventors: Matthew Wayne Wallace, Farmington, CT (US); Andrew Paul Lundell, New Britain, CT (US); David Anthony Zboray, Trumbull, CT (US); Matthew Alan Bennett, Stratford, CT (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 125 days.

This patent is subject to a terminal disclaimer.

(21) Appl. No.: 15/336,051

(22) Filed: Oct. 27, 2016

(65) Prior Publication Data

US 2017/0046982 A1 Feb. 16, 2017

Related U.S. Application Data

(63) Continuation of application No. 12/504,870, filed on Jul. 17, 2009, now Pat. No. 9,483,959.

(Continued)

(51) Int. Cl.
*G09B 5/02* (2006.01)
*G09B 19/24* (2006.01)
*G09B 9/00* (2006.01)

(52) U.S. Cl.
CPC .............. *G09B 19/24* (2013.01); *G09B 5/02* (2013.01); *G09B 9/00* (2013.01)

(58) Field of Classification Search
CPC ............................. A61B 5/1124; B23K 9/127
(Continued)

(56) References Cited

U.S. PATENT DOCUMENTS

| 317,063 | A | 5/1885 | Wittenstrom |
| 428,459 | A | 5/1890 | Coffin |

(Continued)

FOREIGN PATENT DOCUMENTS

| CA | 2698078 | 9/2011 |
| CN | 101193723 A | 6/2008 |

(Continued)

OTHER PUBLICATIONS

United States Provisional Patent Application for "System for Characterizing Manual Welding Operations on Pipe and Other Curved Structures," U.S. Appl. No. 62/055,724, filed Sep. 26, 2014, 35 pages.

(Continued)

*Primary Examiner* — Omkar A Deodhar
*Assistant Examiner* — Ross A Williams

(57) ABSTRACT

Embodiments of the present invention pertain to a computer program product and processor based computing system that provides processing means for executing coded instructions and input means for interacting with said processing means to create a virtual welding environment. The system establishes an objective to change a functional or operational state of a virtual article, and directs the end user to perform at least one virtual welding operation for changing its functional state. The system trains new users and inexperienced welders on the fundamental aspects of welding.

25 Claims, 7 Drawing Sheets

Related U.S. Application Data

(60) Provisional application No. 61/090,794, filed on Aug. 21, 2008.

(58) Field of Classification Search
USPC .......................... 463/1–6, 46; 434/234, 219
See application file for complete search history.

(56) References Cited

U.S. PATENT DOCUMENTS

| | | |
|---|---|---|
| 483,428 A | 9/1892 | Coffin |
| 979,636 A | 12/1910 | Ashdown |
| 1,159,119 A | 11/1915 | Springer |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters |
| 3,555,239 A | 1/1971 | Kerth |
| 3,621,177 A | 11/1971 | McPherson |
| 3,654,421 A | 4/1972 | Streetman et al. |
| 3,739,140 A | 6/1973 | Rotilio |
| 3,866,011 A | 2/1975 | Cole |
| 3,867,769 A | 2/1975 | Schow |
| 3,904,845 A | 9/1975 | Minkeiwicz |
| 3,988,913 A | 11/1976 | Metcalfe |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros |
| 4,275,266 A | 6/1981 | Laser |
| 4,280,041 A | 7/1981 | Kiessliling |
| 4,280,042 A | 7/1981 | Berger et al. |
| 4,280,137 A | 7/1981 | Ashida |
| 4,314,125 A | 2/1982 | Nakamura |
| 4,354,087 A | 10/1982 | Osterlitz |
| 4,359,622 A | 11/1982 | Dostoomian |
| 4,375,026 A | 2/1983 | Kearney |
| 4,410,787 A | 10/1983 | Kremers |
| 4,429,266 A | 1/1984 | Tradt |
| 4,452,589 A | 6/1984 | Denison |
| D275,292 S | 8/1984 | Bouman |
| D277,761 S | 2/1985 | Korovin |
| 4,523,808 A | 6/1985 | Miller |
| 4,525,619 A | 6/1985 | Ide et al. |
| D280,329 S | 8/1985 | Bouman |
| 4,611,111 A | 9/1986 | Baheti |
| 4,616,326 A | 10/1986 | Meier |
| 4,629,860 A | 12/1986 | Lindbom |
| 4,641,282 A | 2/1987 | Ounuma |
| 4,677,277 A | 6/1987 | Cook |
| 4,680,014 A | 7/1987 | Paton |
| 4,689,021 A | 8/1987 | Vasiliev |
| 4,707,582 A | 11/1987 | Beyer |
| 4,716,273 A | 12/1987 | Paton |
| D297,704 S | 9/1988 | Bulow |
| 4,867,685 A | 9/1989 | Brush |
| 4,877,940 A | 10/1989 | Bangs |
| 4,897,521 A | 1/1990 | Burr |
| 4,907,973 A | 3/1990 | Hon |
| 4,931,018 A | 6/1990 | Herbst |
| 4,973,814 A | 11/1990 | Kojima et al. |
| 4,998,050 A | 3/1991 | Nishiyama |
| 5,034,593 A | 7/1991 | Rice |
| 5,061,841 A | 10/1991 | Richardson |
| 5,089,914 A | 2/1992 | Prescott |
| 5,192,845 A | 3/1993 | Kirmsse |
| 5,206,472 A | 4/1993 | Myking |
| 5,266,930 A | 11/1993 | Ichikawa |
| 5,285,916 A | 2/1994 | Ross |
| 5,305,183 A | 4/1994 | Teynor |
| 5,320,538 A | 6/1994 | Baum |
| 5,337,611 A | 8/1994 | Fleming |
| 5,360,156 A | 11/1994 | Ishizaka |
| 5,360,960 A | 11/1994 | Shirk |
| 5,370,071 A | 12/1994 | Ackermann |
| D359,296 S | 6/1995 | Witherspoon |
| 5,424,634 A | 6/1995 | Goldfarb |
| 5,436,638 A | 7/1995 | Bolas |
| 5,464,957 A | 11/1995 | Kidwell |
| D365,583 S | 12/1995 | Viken |
| 5,562,843 A | 10/1996 | Yasumoto |
| 5,662,822 A | 9/1997 | Tada |
| 5,670,071 A | 9/1997 | Ueyama |
| 5,671,158 A | 9/1997 | Fournier |
| 5,676,503 A | 10/1997 | Lang |
| 5,676,867 A | 10/1997 | Allen |
| 5,708,253 A | 1/1998 | Bloch |
| 5,710,405 A | 1/1998 | Solomon |
| 5,719,369 A | 2/1998 | White |
| D392,534 S | 3/1998 | Degen |
| 5,728,991 A | 3/1998 | Takada |
| 5,734,421 A | 3/1998 | Maguire, Jr. |
| 5,751,258 A | 5/1998 | Fergason |
| D395,269 S | 6/1998 | Kaya |
| D396,238 S | 7/1998 | Schmitt |
| 5,781,258 A | 7/1998 | Debral |
| 5,805,183 A | 9/1998 | Lidke et al. |
| 5,823,785 A | 10/1998 | Matherne, Jr. |
| 5,835,077 A | 11/1998 | Dao |
| 5,835,277 A | 11/1998 | Hegg |
| 5,845,053 A | 12/1998 | Watanabe |
| 5,877,777 A | 3/1999 | Colwell |
| 5,896,579 A | 4/1999 | Johnson |
| 5,916,464 A | 6/1999 | Geiger |
| 5,963,891 A | 10/1999 | Walker |
| 6,008,470 A | 12/1999 | Zhang et al. |
| 6,037,948 A | 3/2000 | Liepa |
| 6,049,059 A | 4/2000 | Kim |
| 6,051,805 A | 4/2000 | Vaidya et al. |
| 6,114,645 A | 9/2000 | Burgess |
| 6,146,147 A * | 11/2000 | Wasowicz ................ G09B 5/04 434/118 |
| 6,155,475 A | 12/2000 | Ekelof et al. |
| 6,155,928 A | 12/2000 | Burdick |
| 6,179,619 B1 | 1/2001 | Tanaka |
| 6,230,327 B1 | 5/2001 | Briand |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama |
| 6,330,938 B1 | 12/2001 | Herve |
| 6,330,966 B1 | 12/2001 | Eissfeller |
| 6,331,848 B1 | 12/2001 | Stove |
| D456,428 S | 4/2002 | Aronson |
| 6,373,465 B2 | 4/2002 | Jolly |
| 6,397,186 B1 | 5/2002 | Bush |
| D461,383 S | 8/2002 | Balckburn |
| 6,441,342 B1 | 8/2002 | Hsu |
| 6,445,964 B1 | 9/2002 | White |
| 6,492,618 B1 | 12/2002 | Flood |
| 6,506,997 B2 | 1/2003 | Matsuyama |
| 6,552,303 B1 | 4/2003 | Blankenship |
| 6,560,029 B1 | 5/2003 | Dobbie |
| 6,563,489 B1 | 5/2003 | Latypov |
| 6,568,846 B1 | 5/2003 | Cote |
| D475,726 S | 6/2003 | Suga |
| 6,572,379 B1 | 6/2003 | Sears |
| 6,583,386 B1 | 6/2003 | Ivkovich |
| 6,621,049 B2 | 9/2003 | Suzuki |
| 6,624,388 B1 | 9/2003 | Blankenship |
| D482,171 S | 11/2003 | Vui |
| 6,647,288 B2 | 11/2003 | Madill |
| 6,649,858 B2 | 11/2003 | Wakeman |
| 6,655,645 B1 | 12/2003 | Lu |
| 6,660,965 B2 | 12/2003 | Simpson |

(56) References Cited

U.S. PATENT DOCUMENTS

| | | |
|---|---|---|
| 6,697,701 B2 | 2/2004 | Hillen |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship |
| 6,715,502 B1 | 4/2004 | Rome |
| 6,720,878 B2 | 4/2004 | Jumpertz |
| D490,347 S | 5/2004 | Meyers |
| 6,730,875 B2 | 5/2004 | Hsu |
| 6,734,393 B1 | 5/2004 | Friedl |
| 6,744,011 B1 | 6/2004 | Hu |
| 6,750,428 B2 | 6/2004 | Okamoto |
| 6,765,584 B1 | 7/2004 | Wloka et al. |
| 6,772,802 B2 | 8/2004 | Few |
| 6,768,974 B1 | 9/2004 | Nakano |
| 6,788,442 B1 | 9/2004 | Potin |
| 6,795,778 B2 | 9/2004 | Dodge |
| 6,798,974 B1 | 9/2004 | Nakano |
| 6,857,553 B1 | 2/2005 | Hartman |
| 6,858,817 B2 | 2/2005 | Blankenship |
| 6,865,926 B1 | 3/2005 | O'Brien |
| 6,871,958 B2 | 3/2005 | Christensen |
| D504,449 S | 4/2005 | Butchko |
| 6,920,371 B2 | 7/2005 | Hillen |
| 6,940,037 B1 | 9/2005 | Kovacevic et al. |
| 6,940,039 B2 | 9/2005 | Blankenship |
| 7,021,937 B2 | 4/2006 | Simpson |
| 7,024,342 B1 | 4/2006 | Waite et al. |
| 7,126,078 B2 | 10/2006 | Demers |
| 7,132,617 B2 | 11/2006 | Lee |
| 7,170,032 B2 | 1/2007 | Flood |
| 7,184,447 B1 | 3/2007 | Harvey |
| 7,247,814 B2 | 7/2007 | Ott |
| D555,446 S | 11/2007 | Picaza Ibarrondo |
| 7,315,241 B1 | 1/2008 | Daily |
| D561,973 S | 2/2008 | Kinsley |
| 7,346,972 B2 | 3/2008 | Inget |
| 7,353,715 B2 | 4/2008 | Myers |
| 7,363,137 B2 | 4/2008 | Brant |
| 7,375,304 B2 | 5/2008 | Kainec |
| 7,381,923 B2 | 6/2008 | Gordon |
| 7,414,595 B1 | 8/2008 | Muffler |
| 7,465,230 B2 | 12/2008 | Lemay |
| 7,478,108 B2 | 1/2009 | Townsend |
| D587,975 S | 3/2009 | Aronson |
| 7,516,022 B2 | 4/2009 | Lee |
| 7,557,327 B2 | 7/2009 | Matthews |
| 7,580,821 B2 | 8/2009 | Schirm et al. |
| D602,057 S | 10/2009 | Osicki |
| 7,621,171 B2 | 11/2009 | O'Brien |
| D606,102 S | 12/2009 | Bender |
| 7,643,890 B1 | 1/2010 | Hillen |
| 7,687,741 B2 | 3/2010 | Kainec |
| D614,217 S | 4/2010 | Peters |
| D615,573 S | 5/2010 | Peters |
| 7,817,162 B2 | 10/2010 | Bolick |
| 7,853,645 B2 | 12/2010 | Brown |
| D631,074 S | 1/2011 | Peters |
| 7,874,921 B2 | 1/2011 | Baszucki |
| 7,926,228 B1 | 4/2011 | Becker |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear |
| 8,248,324 B2 | 8/2012 | Nangle |
| 8,265,886 B2 | 9/2012 | Bisiaux |
| 8,274,013 B2 | 9/2012 | Wallace |
| 8,287,522 B2 | 10/2012 | Moses |
| 8,316,462 B2 | 11/2012 | Becker |
| 8,363,048 B2 | 1/2013 | Gering |
| 8,365,603 B2 | 2/2013 | Lesage |
| 8,512,043 B2 | 8/2013 | Choquet |
| 8,569,646 B2 | 10/2013 | Daniel |
| 8,680,434 B2 | 3/2014 | Stoger et al. |
| 8,747,116 B2 | 6/2014 | Zboray et al. |
| 8,777,629 B2 | 7/2014 | Kreindl |
| RE45,062 E | 8/2014 | Maguire, Jr. |
| 8,851,896 B2 | 10/2014 | Wallace et al. |
| 8,860,760 B2 | 10/2014 | Chen |
| 8,915,740 B2 | 12/2014 | Zboray |
| RE45,398 E | 3/2015 | Wallace |
| 8,992,226 B1 | 3/2015 | Leach et al. |
| 9,011,154 B2 | 4/2015 | Kindig et al. |
| 9,293,056 B2 | 3/2016 | Zboray et al. |
| 9,293,057 B2 | 3/2016 | Zboray et al. |
| 9,318,026 B2 | 4/2016 | Peters et al. |
| 9,323,056 B2 | 4/2016 | Williams |
| 9,483,959 B2 * | 11/2016 | Wallace ................. G09B 19/24 |
| 9,522,437 B2 | 12/2016 | Pfeifer |
| 9,657,605 B2 | 5/2017 | Liu et al. |
| 9,761,153 B2 | 9/2017 | Zboray et al. |
| 9,767,712 B2 | 9/2017 | Postlethwaite |
| 9,818,312 B2 | 11/2017 | Zboray et al. |
| 9,836,994 B2 | 12/2017 | Kindig et al. |
| 9,911,359 B2 | 3/2018 | Wallace |
| 9,911,360 B2 | 3/2018 | Wallace |
| 9,928,755 B2 | 3/2018 | Wallace et al. |
| 2001/0045808 A1 | 11/2001 | Hietmann et al. |
| 2001/0052893 A1 | 12/2001 | Jolly |
| 2002/0032553 A1 | 3/2002 | Simpson |
| 2002/0046999 A1 | 4/2002 | Viekkolainen |
| 2002/0050984 A1 | 5/2002 | Roberts |
| 2002/0085843 A1 | 7/2002 | Mann |
| 2002/0175897 A1 | 11/2002 | Pelosi |
| 2003/0000931 A1 | 1/2003 | Ueda |
| 2003/0023592 A1 | 1/2003 | Modica |
| 2003/0025884 A1 | 2/2003 | Hamana et al. |
| 2003/0069866 A1 | 4/2003 | Ohno |
| 2003/0075534 A1 | 4/2003 | Okamoto et al. |
| 2003/0106787 A1 | 6/2003 | Santilli |
| 2003/0111451 A1 | 7/2003 | Blankenship |
| 2003/0172032 A1 | 9/2003 | Choquet |
| 2003/0186199 A1 | 10/2003 | McCool et al. |
| 2003/0206491 A1 | 11/2003 | Pacheco |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0088071 A1 | 5/2004 | Kouno et al. |
| 2004/0140301 A1 | 7/2004 | Blankenship |
| 2004/0181382 A1 | 9/2004 | Hu et al. |
| 2004/0217096 A1 | 11/2004 | Lipnevicius |
| 2005/0007504 A1 | 1/2005 | Fergason |
| 2005/0017152 A1 | 1/2005 | Fergason |
| 2005/0029326 A1 | 2/2005 | Henrickson |
| 2005/0046584 A1 | 3/2005 | Breed |
| 2005/0050168 A1 | 3/2005 | Wen et al. |
| 2005/0101767 A1 | 5/2005 | Clapham |
| 2005/0103766 A1 | 5/2005 | Lizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 7/2005 | Blankenship |
| 2005/0159840 A1 | 7/2005 | Lin et al. |
| 2005/0163364 A1 | 7/2005 | Beck et al. |
| 2005/0189336 A1 | 9/2005 | Ku |
| 2005/0199602 A1 | 9/2005 | Kaddani |
| 2005/0230573 A1 | 10/2005 | Ligertwood |
| 2005/0252897 A1 | 11/2005 | Hsu |
| 2005/0275913 A1 | 12/2005 | Vesely |
| 2005/0275914 A1 | 12/2005 | Vesley |
| 2006/0014130 A1 | 1/2006 | Weinstein |
| 2006/0076321 A1 | 4/2006 | Maev et al. |
| 2006/0136183 A1 | 6/2006 | Choquet |
| 2006/0142656 A1 | 6/2006 | Malackowski et al. |
| 2006/0154226 A1 | 7/2006 | Maxfield |
| 2006/0163227 A1 | 7/2006 | Hillen et al. |
| 2006/0166174 A1 | 7/2006 | Rowe et al. |
| 2006/0173619 A1 | 8/2006 | Brant |
| 2006/0189260 A1 | 8/2006 | Sung |
| 2006/0169682 A1 | 9/2006 | Ott |
| 2006/0207980 A1 | 9/2006 | Jacovetty et al. |

(56) References Cited

U.S. PATENT DOCUMENTS

| | | |
|---|---|---|
| 2006/0213892 A1 | 9/2006 | Ott |
| 2006/0214924 A1 | 9/2006 | Kawamoto |
| 2006/0226137 A1 | 10/2006 | Huismann |
| 2006/0252543 A1 | 11/2006 | Van Noland et al. |
| 2006/0258447 A1 | 11/2006 | Baszucki et al. |
| 2007/0034611 A1 | 2/2007 | Drius |
| 2007/0038400 A1 | 2/2007 | Lee |
| 2007/0045488 A1 | 3/2007 | Shin |
| 2007/0049374 A1* | 3/2007 | Ikeda ............... A63F 13/06 463/30 |
| 2007/0088536 A1 | 4/2007 | Ishikawa |
| 2007/0112889 A1 | 5/2007 | Cook et al. |
| 2007/0198117 A1 | 8/2007 | Wajihuddin |
| 2007/0209586 A1 | 9/2007 | Ebensberger et al. |
| 2007/0211026 A1 | 9/2007 | Ohta |
| 2007/0221797 A1 | 9/2007 | Thompson |
| 2007/0256503 A1 | 11/2007 | Wong |
| 2007/0264620 A1* | 11/2007 | Maddix ............. G09B 19/003 434/219 |
| 2007/0277611 A1 | 12/2007 | Portzgen |
| 2007/0291035 A1 | 12/2007 | Vesley |
| 2008/0021311 A1 | 1/2008 | Goldbach |
| 2008/0027594 A1 | 1/2008 | Jump |
| 2008/0031774 A1 | 2/2008 | Magnant et al. |
| 2008/0038702 A1* | 2/2008 | Choquet ............. A61B 5/1124 434/260 |
| 2008/0061113 A9 | 3/2008 | Seki et al. |
| 2008/0078811 A1 | 4/2008 | Hillen |
| 2008/0078812 A1 | 4/2008 | Peters |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer et al. |
| 2008/0140815 A1 | 7/2008 | Brant |
| 2008/0149686 A1 | 7/2008 | Daniel |
| 2008/0203075 A1 | 8/2008 | Feldhausen |
| 2008/0233550 A1 | 9/2008 | Solomon |
| 2008/0303197 A1 | 12/2008 | Paquette et al. |
| 2008/0314887 A1 | 12/2008 | Stoger |
| 2009/0015585 A1 | 1/2009 | Klusza |
| 2009/0021514 A1 | 1/2009 | Klusza |
| 2009/0045183 A1 | 2/2009 | Arteismair |
| 2009/0050612 A1 | 2/2009 | Serruys |
| 2009/0057286 A1 | 3/2009 | Ihara |
| 2009/0152251 A1 | 6/2009 | Dantinne et al. |
| 2009/0173726 A1 | 7/2009 | Davidson |
| 2009/0184098 A1 | 7/2009 | Daniel |
| 2009/0200281 A1 | 8/2009 | Hampton |
| 2009/0200282 A1 | 8/2009 | Hampton |
| 2009/0231423 A1 | 9/2009 | Becker |
| 2009/0259444 A1 | 10/2009 | Dolansky |
| 2009/0298024 A1 | 12/2009 | Batzier |
| 2009/0325699 A1 | 12/2009 | Delgiannidis |
| 2010/0012017 A1 | 1/2010 | Miller |
| 2010/0012637 A1 | 1/2010 | Jaeger |
| 2010/0048273 A1 | 2/2010 | Wallace et al. |
| 2010/0062405 A1 | 3/2010 | Zboray et al. |
| 2010/0062406 A1 | 3/2010 | Zboray |
| 2010/0096373 A1 | 4/2010 | Hillen |
| 2010/0121472 A1 | 5/2010 | Babu et al. |
| 2010/0133247 A1 | 6/2010 | Mazumder |
| 2010/0133250 A1 | 6/2010 | Sardy |
| 2010/0176107 A1 | 7/2010 | Bong |
| 2010/0201803 A1 | 8/2010 | Melikian |
| 2010/0223706 A1 | 9/2010 | Becker |
| 2010/0224610 A1 | 9/2010 | Wallace |
| 2010/0276396 A1 | 11/2010 | Cooper |
| 2010/0299101 A1 | 11/2010 | Shimada et al. |
| 2010/0307249 A1 | 12/2010 | Lesage et al. |
| 2011/0006047 A1 | 1/2011 | Penrod et al. |
| 2011/0060568 A1 | 3/2011 | Goldfine |
| 2011/0091846 A1 | 4/2011 | Kreindl |
| 2011/0114615 A1 | 5/2011 | Daniel |
| 2011/0116076 A1 | 5/2011 | Chantry |
| 2011/0117527 A1 | 5/2011 | Conrardy |
| 2011/0122495 A1 | 5/2011 | Togashi |
| 2011/0183304 A1 | 7/2011 | Wallace |
| 2011/0187746 A1 | 8/2011 | Suto et al. |
| 2011/0248864 A1 | 10/2011 | Becker |
| 2011/0290765 A1 | 12/2011 | Albrecht et al. |
| 2011/0316516 A1 | 12/2011 | Schiefermuller |
| 2012/0122062 A1 | 5/2012 | Yang et al. |
| 2012/0189993 A1 | 7/2012 | Kindig |
| 2012/0291172 A1 | 11/2012 | Wills |
| 2012/0298640 A1 | 11/2012 | Conrardy |
| 2013/0026150 A1 | 1/2013 | Chantry |
| 2013/0040270 A1 | 2/2013 | Albrecht |
| 2013/0049976 A1 | 2/2013 | Maggiore |
| 2013/0075380 A1 | 3/2013 | Albrech |
| 2013/0182070 A1 | 7/2013 | Peters et al. |
| 2013/0183645 A1 | 7/2013 | Wallace et al. |
| 2013/0189657 A1 | 7/2013 | Wallace |
| 2013/0189658 A1 | 7/2013 | Peters |
| 2013/0209976 A1 | 8/2013 | Postlethwaite et al. |
| 2013/0231980 A1 | 9/2013 | Elgart et al. |
| 2013/0230832 A1 | 11/2013 | Peters |
| 2013/0327747 A1 | 12/2013 | Dantinne et al. |
| 2014/0017642 A1 | 1/2014 | Postlethwaite et al. |
| 2014/0038143 A1 | 2/2014 | Daniel |
| 2014/0065584 A1 | 3/2014 | Wallace et al. |
| 2014/0134579 A1 | 5/2014 | Becker |
| 2014/0134580 A1 | 5/2014 | Becker |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0315167 A1 | 10/2014 | Kreindl et al. |
| 2014/0322684 A1 | 10/2014 | Wallace et al. |
| 2014/0346158 A1 | 11/2014 | Matthews |
| 2015/0056584 A1 | 2/2015 | Boulware |
| 2015/0056585 A1 | 2/2015 | Boulware |
| 2015/0056856 A1 | 2/2015 | Penrod |
| 2015/0228203 A1 | 8/2015 | Kindig |
| 2015/0298640 A1 | 10/2015 | Tomaj |
| 2015/0375323 A1 | 12/2015 | Becker |
| 2016/0125763 A1 | 5/2016 | Becker |
| 2016/0260261 A1 | 9/2016 | Hsu |
| 2017/0046974 A1 | 2/2017 | Becker |

FOREIGN PATENT DOCUMENTS

| | | |
|---|---|---|
| CN | 101209512 | 7/2008 |
| CN | 101214178 | 7/2008 |
| CN | 201083660 | 7/2008 |
| CN | 101419755 | 4/2009 |
| CN | 201229711 | 4/2009 |
| CN | 11571887 | 11/2009 |
| CN | 101587659 | 11/2009 |
| CN | 102014819 A | 4/2011 |
| CN | 102165504 A | 8/2011 |
| CN | 102171744 | 8/2011 |
| CN | 102298858 A | 12/2011 |
| CN | 202684308 U | 1/2013 |
| CN | 103871279 | 6/2014 |
| CN | 105057869 A | 11/2015 |
| CN | 107316544 A | 11/2017 |
| DE | 2833638 | 2/1980 |
| DE | 3046634 | 7/1982 |
| DE | 3244307 | 5/1984 |
| DE | 3522581 | 1/1987 |
| DE | 4037879 | 6/1991 |
| DE | 19615069 | 10/1997 |
| DE | 19739720 | 10/1998 |
| DE | 19834205 | 2/2000 |
| DE | 20009543 | 8/2001 |
| DE | 102005047204 | 4/2007 |
| DE | 102010038902 | 2/2012 |
| DE | 202012013151 | 2/2015 |
| EP | 0108599 | 5/1984 |
| EP | 0127299 | 12/1984 |
| EP | 0145891 | 6/1985 |
| EP | 0319623 | 10/1990 |

(56) References Cited

FOREIGN PATENT DOCUMENTS

| | | |
|---|---|---|
| EP | 0852986 | 7/1998 |
| EP | 1010490 | 6/2000 |
| EP | 1527852 | 5/2005 |
| EP | 1905533 | 2/2008 |
| ES | 2274736 | 5/2007 |
| FR | 1456780 | 3/1965 |
| FR | 2827066 | 1/2003 |
| FR | 2926660 | 7/2009 |
| GB | 1455972 | 11/1976 |
| GB | 1511608 | 5/1978 |
| GB | 2254172 | 4/1992 |
| GB | 2435838 | 9/2007 |
| GB | 2454232 | 5/2009 |
| JP | 478719 | 10/1972 |
| JP | 5098035 | 8/1975 |
| JP | 2-224877 | 9/1990 |
| JP | 05329645 | 12/1993 |
| JP | 08505091 | 7/1994 |
| JP | 07047471 | 2/1995 |
| JP | 07232270 | 9/1995 |
| JP | 08150476 | 6/1996 |
| JP | 08132274 | 5/1998 |
| JP | 2000167666 | 6/2000 |
| JP | 20000237872 | 9/2000 |
| JP | 2001-071140 | 3/2001 |
| JP | 2002278670 | 9/2002 |
| JP | 2002366021 | 12/2002 |
| JP | 2003200372 | 7/2003 |
| JP | 2003-326362 | 11/2003 |
| JP | 20006006604 | 1/2006 |
| JP | 2006175205 | 7/2006 |
| JP | 2006281270 | 10/2006 |
| JP | 2007290025 | 11/2007 |
| JP | 2009500178 | 1/2009 |
| JP | 2009160636 | 7/2009 |
| JP | 2010231792 | 10/2010 |
| JP | 2011528283 | 11/2011 |
| JP | 2012024867 | 2/2012 |
| JP | 2013091086 | 5/2013 |
| KR | 10-0876425 | 12/2008 |
| KR | 20090010693 | 1/2009 |
| KR | 10-2011-0068544 | 6/2011 |
| KR | 20140030644 A | 3/2014 |
| RU | 2317183 | 2/2008 |
| RU | 2008108601 | 11/2009 |
| SU | 1038963 | 8/1983 |
| SU | 1651309 A1 | 5/1991 |
| SU | 527045 | 7/1995 |
| WO | WO-98/45078 | 10/1998 |
| WO | WO-0112376 | 2/2001 |
| WO | WO2001009867 | 2/2001 |
| WO | WO-01/43910 | 6/2001 |
| WO | WO-0158400 | 8/2001 |
| WO | WO-2004029549 | 4/2004 |
| WO | WO-2005102230 | 11/2005 |
| WO | WO-2006034571 A1 | 4/2006 |
| WO | WO-2007009131 A1 | 1/2007 |
| WO | WO-2007039278 | 4/2007 |
| WO | WO-2009120921 | 1/2009 |
| WO | WO-2009060231 | 5/2009 |
| WO | WO-2009149740 | 12/2009 |
| WO | WO-2010000003 | 1/2010 |
| WO | WO-2010020867 A2 | 2/2010 |
| WO | WO-2010020870 A2 | 2/2010 |
| WO | WO-2010044982 | 4/2010 |
| WO | WO-2010091493 | 8/2010 |
| WO | WO-2011045654 | 4/2011 |
| WO | WO-2011058433 | 5/2011 |
| WO | WO-2011067447 | 6/2011 |
| WO | WO 2011097035 | 8/2011 |
| WO | WO2011148258 | 12/2011 |
| WO | WO-2012082105 | 6/2012 |
| WO | WO2012137060 | 10/2012 |
| WO | WO-2012143327 | 10/2012 |
| WO | WO 2013008235 | 1/2013 |
| WO | WO-2013014202 | 1/2013 |
| WO | WO201325672 | 2/2013 |
| WO | WO-2013061518 A1 | 5/2013 |
| WO | WO-2013114189 | 8/2013 |
| WO | WO-2013175079 | 11/2013 |
| WO | WO-2014007830 | 1/2014 |
| WO | WO-2014019045 | 2/2014 |
| WO | WO-2014020386 | 2/2014 |
| WO | WO2014140722 | 8/2014 |
| WO | WO 2016137578 | 1/2016 |
| WO | WO2014140721 | 9/2017 |

OTHER PUBLICATIONS

The Lincoln Electric Company, VRTEX Virtual Reality Arc Welding Trainer, http://www.lincolnelectric.com/en-us/Equipment/training-equipment/Pages/vrtex.aspx as accessed on Jul. 10, 2015, 3 pages.

Echtler et al, "17 The Intelligent Welding Gun: Augmented Reality for Experimental Vehicle Construction," Virtual and Augmented Reality Applications in Manufacturing (2003) pp. 1-27.

Teeravarunyou et al, "Computer Based Welding Training System," International Journal of Industrial Engineering (2009) 16(2): 116-125.

Antonelli et al, "A Semi-Automated Welding Station Exploiting Human-Robot Interaction," Advanced Manufacturing Systems and Technology (2011) pp. 249-260.

Praxair Technology Inc, "The Real Weld Trainer System: Real Weld Training Under Real Conditions" Brochure (2013) 2 pages.

Wuhan Onew Technology Co Ltd, "ONEW-360 Welding Training Simulator" http://en.onewtech.com/_d276479751.htm as accessed on Jul. 10, 2015, 12 pages.

Miller Electric Mfg Co, "LiveArc: Welding Performance Management System" Owner's Manual, (Jul. 2014) 64 pages.

Miller Electric Mfg Co, "LiveArc Welding Performance Management System" Brochure, (Dec. 2014) 4 pages.

T. Borzecki, G. Bruce, YS. Han, et al., Specialist Committee V.3 Fabrication Technology Committee Mandate, August 20-25, 2006, 49 pages, vol. 2, 16th International Ship and Offshore Structures Congress, Southampton, UK.

G. Wang, P.G. Huang, and Y.M. Zhang:"Numerical Analysis of Metal Transfer in Gas Metal Arc Welding": Departments of Mechanical Engineering; and Electrical and Computer Engineering, University of Kentucky, Lexington,KY 40506-0108, Dec. 10, 2001, 10 pages.

Steve Mann, Raymond Chun Bing Lo, Kalin Ovtcharov, Shixiang Gu, David Dai, Calvin Ngan, Tao Al, Real Time HDR (High Dynamic Range) Video for EYETAP Wearable Computers, FPGA-Based Seeing Aids, and GLASSEYES (EYETAPS), 2012 25th IEEE Canadian Conference on Electrical and Computer Engineering (CCECE),pp. 1-6, 6 pages, Apr. 29, 2012.

Kyt Dotson, Augmented Reality Welding Helmet Prototypes How Awesome the Technology Can Get, Sep. 26, 2012, Retrieved from the Internet: URL:http://siliconangle.com/blog/2012/09/26/augmented-reality-welding-helmet- prototypes-how-awesome-the-technology-can-gel/, 1 page, retrieved on Sep. 26, 2014.

Terrence O'Brien, "Google's Project Glass gets some more details",Jun. 27, 2012 (Jun. 27, 2012), Retrieved from the Internet: http://www.engadgel.com/2012/06/27/googles-project-glass-gets-some-more-details/, 1 page, retrieved on Sep. 26, 2014. Yao, et al., 'Development of a Robot System for Pipe Welding'_ 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112, 4 pages, 2010.

ANANSI/A WS D 10.11 MID 10. 11 :2007 Guide for Root Pass Welding of Pipe without Backing Edition: 3rd American Welding Society/ Oct. 13, 2006/36 pages ISBN: 0871716445, 6 pages.

M. Jonsson, L. Karlsson, and L-E Lindgren, Simulation of Tack Welding Procedures in Butt Joint Welding of Plates Welding Research Supplement, 7 pages, Oct. 1985.

Isaac Brana Veiga, Simulation of a Work Cell in the IGRIP Program, 50 pages, dated 2006.

(56) References Cited

OTHER PUBLICATIONS

Balijepalli, A. and Kesavadas, Haptic Interfaces for Virtual Environment and Teleoperator Systems, Haptics 2003, 7—Department of Mechanical & Aerospace Engineering, State University of New York at Buffalo, NY, 7 pages, 2003.
Johannes Hirche, Alexander Ehlert, Stefan Guthe, Michael Dogged, Hardware Accelerated Per-Pixel Displacement Mapping, 8 pages, Estimated Dec. 2004.
William T. Reeves, "Particles Systems—A Technique for Modeling a Class of Fuzzy Objects", Computer Graphics 17:3 pp. 359-376, 17 pages, 1983.
Guu and Rokhlin ,Technique for Simultaneous Real-Time Measurements of Weld Pool Surface Geometry and Arc Force, 10 pages, Dec. 1992.
D. Mavrikios, V. Karabatsou, D. Fragos and G. Chryssolouris, A prototype virtual reality-based demonstrator for immersive and interactive simulation of welding processes, International Journal of Computer Integrated Manufacturing, abstract, 1 page, Apr.-May 2006, 294-300, vol. 19, No. 3, http://eds.a.ebscohosl.com/eds/pdfviewer/pdfviewer?vid=2&sid=ab8fe67b-1 f7.
S.B. Chen, L. Wu, Q_ L. Wang and Y. C. Liu, Self-Learning Fuzzy Neural Networks and Computer Vision for Control of Pulsed GTAW, 9 pages, dated May 1997.
Patrick Rodjito, Position tracking and motion prediction using Fuzzy Logic, 81 pages, 2006, Colby College.
D'Huart, Deat, and Lium; Virtual Environment for Training, 6th International Conference, ITS 20002, 6 pages, Jun. 2002.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
Nancy C. Porter, J_ Allan Cote, Timothy D. Gifford, and Wim Lam, Virtual Reality Welder Training, 29 pages, dated Jul. 14, 2006.
J.Y. (Yosh) Mantinband, Hillel Goldenberg, Llan Kleinberger, Paul Kleinberger, Autosteroscopic, field-sequential display with full freedom of movement or Let the display were the shutter-glasses, 3ality (Israel) Lid., 8 pages, 2002.
ViziTech USA, ViziTech USA webpage, retrieved on Mar. 27, 2014 from http://vizitechusa.com/, 2 pages.
Chuansong Wu: "Microcomputer-based welder training simulator", Computers in Industry, vol. 20, No. 3, Oct. 1992, pp. 321-325, XP000205597, Elsevier Science Publishers, Amsterdam, NL.
Russian Decision of Refusal for corresponding application No. 2011110478, dated Jun. 28, 2013. No translation is available.
ChemWeb.com—Journal of Materials Engineering (printedSep. 26, 2012) (01928041).
Juan Vicenete Rosell Gonzales, "RV-Sold: simulator virtual para la formacion de soldadores"; Deformacion Metalica, Es. vol. 34, No. 301 Jan. 1, 2008.
White et al., Virtual welder training, 2009 IEEE Virtual Reality Conference, p. 303, 2009.
P. Beatriz Garcia-Allende, Jesus Mirapeix, Olga M. Conde, Adolfo Cobo and Jose M. Lopez—4 HIGUERA; Defect Detection in Arc-Welding Processes by Means of the Line-to-Continuum Method and Feature Selection; www.mdpi.com/journal/sensors; Sensors 2009, 9, 7753-7770; doi; 10.3390/s91007753.
Training in a virtual environment gives welding students a leg up, retrieved on Apr. 12, 2010 from: http://www. thefabricator.com/article/arcwelding/virtually-welding.
Sim Welder, retrieved on Apr. 12, 2010 from: http://www.simwelder.com.
The Lincoln Electric Company; CheckPoint Production Monitoring borchure; four (4) pages; http://www. lincolnelectric.com/assets/en_US/products/literature/s232.pdf; Publication S2.32; Issue Date Feb. 2012.
Bjorn G. Ag Ren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb. com/cgi/dwclient?req=1331233317524; one (1) page; printed Mar. 8, 2012.
Miller Electric MGF Co.; MIG Welding System features weld monitoring software; NewsRoom 2010 (Dialog® File 992); © 2011 Dialog. 2010; http://www.dialogweb.com/cgi/dwclient?reg=1331233430487; three (3) pages; printed D Mar. 8, 2012.
SIMFOR / CESOL, "RV-SOLD" Welding Simulator, Technical and Functional Features, 20 pages, Estimated Jan. 2010.
International Search Report and Written Opinion from PCT/IB10/02913 dated Apr. 19, 2011.
"Design and Implementation of a Video Sensor for Closed Loop Control of Back Bead Weld Puddle Width," Robert Schoder, Massachusetts Institute of Technology, Dept. of Mechanical Engineering, May 27, 1983.
Hillis and Steele, Jr.; "Data Parallel Algorithms", Communications of the ACM, Dec. 1986, vol. 29, No. 12, p. 1170.
Russel and Norvig, "Artificial Intelligence: A Modern Approach", Prentice-Hall (Copywrite 1995).
Mechanisms and Mechanical Devices Source Book, Chironis, Neil Sclater; McGraw Hill; 2nd Addition, 1996.
ARS Electronica LINZ GMBH, Fronius, 2 pages, May 18, 1997.
"Penetration in Spot GTA Welds during Centrifugation,"D.K. Aidun and S.A. Martin; Journal of Materials Engineering and Performance vol. 7(5) Oct. 1998—597.
Arc+ simulator; http://www.123arc.com/en/depliant_ang.pdf; 2000.
Wade, "Human uses of ultrasound: ancient and modern", Ultrasonics vol. 38, dated 2000.
ASME Definitions, Consumables, Welding Positions, dated Mar. 19, 2001. See B255.
Code Aster (Software) EDF (France), Oct. 2001.
Mahrle, A., et al.; "the influence of fluid flow phenomena on the laser beam welding process" International Journal of Heat and Fluid Flow 23 (2002, No. 3, pp. 288-297; Institute of Fluid Dynamics and Thermodynamics, Otto-van-Guericke University Magdeburg, P.O. Box 4120, D-39016 Magdeburg, Germany.
"Numerical Analysis of Metal Transfer in Gas Metal Arc Welding," G. Wang, P.G. Huang, and Y.M. Zhang. Departments of Mechanical and Electrical Engineering. University of Kentucky, Dec. 10, 2001.
Desroches, X.; Code-Aster, Note of use for aclulations of welding; Instruction manual U2.03 booklet: Thermomechanical; Document: U2.03.05; Oct. 1, 2003.
Fast, K. et al., "Virtual Training for Welding", Mixed and Augmented Reality, 2004, ISMAR 2004, Third IEEE and CM International Symposium on Arlington, VA, Nov. 2-5, 2004.
Cooperative Research Program, Virtual Reality Welder Training, Summary Report SR 0512, 4 pages, Jul. 2005.
Eduwelding+, Weld Into the Future; Online Welding Seminar—A virtual training environment; 123arc.com; 4 pages, 2005.
Arc Simulation & Certification, Weld Into the Future, 4 pages, 2005.
"Numerical simulation to study the effect of tack welds and root gap on welding deformations and residual stresses of a pipe-flange joint" by M. Abida and M. Siddique, Faculty of Mechanical Engineering, GIK Institute of Engineering Sciences and Technology, Topi, NWFP, Pakistan. Available on-line Aug. 25, 2005.
Abbas, M., et al.; Code_Aster; Introduction to Code_Aster; User Manual; Booket U1 .0—: Introduction to Code_Aster; Document: U1 .02.00; Version 7.4; Jul. 22, 2005.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, Apr. 1, 2006, pp. 294-300.
Virtual Reality Welder Trainer, Session 5: Joining Technologies for Naval Applications: earliest dale Jul. 14, 2006 (http://weayback.archive.org) by Nancy C. Porter, Edison Welding Institute; J_ Allan Cote, General Dynamics Electric Boat; Timothy D. Gifford, VRSim, and Wim Lam, FCS Controls. VRSim, and Wim Lam, FCS Controls.
16th International Shop and Offshore Structures Congress: Aug. 20-25, 2006: Southhampton, UK, vol. 2 Specialist Committee V.3 Fabrication Technology Committee Mandate: T Borzecki, G. Bruce, Y.S. Han, M. Heinemann, A lmakita, L. Josefson, W. Nie, D. Olson, F. Roland, and Y. Takeda.
Ratnam and Khalid: "Automatic classification of weld defects using simulated data and an MLP neutral network." Insight vol. 49, No. 3; Mar. 2007.

(56) References Cited

OTHER PUBLICATIONS

Wang et al., Study on welder training by means of haptic guidance and virtual reality for arc welding, 2006 IEEE International Conference on Robotics and Biomimetics, ROBIO 2006 ISBN-10: 1424405718, p. 954-958.
CS Wave, The Virtual Welding Trainer, 6 pages, 2007.
asciencetutor.com, A division of Advanced Science and Automation Corp., VWL (Virtual Welding Lab), 2 pages, 2007.
Eric Linholm, John Nickolls, Stuart Oberman, and John Montrym, "NVIDIA Testla: A Unifired Graphics and Computing Architecture", IEEE Computer Society, 2008.
NSRP ASE, Low-Cost Virtual Reality Welder Training System, 1 Page, 2008.
Edison Welding Institute, E-Weld Predictor, 3 pages, 2008.
CS Wave, A Virtual learning tool for welding motion, 10 pages, Mar. 14, 2008.
The Fabricator, Virtual Welding, 4 pages, Mar. 2008.
N. A. Tech., P/NA.3 Process Modeling and Optimization, 11 pages, Jun. 4, 2008.
FH Joanneum, Fronius—virtual welding, 2 pages, May 12, 2008.
Eduwelding+, Training Activities with arc+ simulator; Weld Into the Future, Online Welding Simulator—A virtual training environment; 123arc.com; 6 pages, May 2008.
U.S. Appl. No. 29/339,980, filed Jul. 10, 2009, issued May 11, 2010 as U.S. Pat. No. 615,573.
U.S. Appl. No. 29/339,979, filed Jul. 10, 2009, issued Apr. 20, 2010 as U.S. Pat. No. 614,217.
U.S. Appl. No. 29/339,978, filed Jul. 10, 2009.
U.S. Appl. No. 12/501,263, filed Jul. 10, 2009 claiming priority to U.S. Appl. No. 61/090,794.
U.S. Appl. No. 12/719,053, filed Mar. 8, 2010 claiming priority to U.S. Appl. No. 61/158,578.
U.S. Appl. No. 12/501,257, filed Jul. 10, 2009 claiming priority to U.S. Appl. No. 61/090,794.
Virtual Reality Welder Training by Nancy C. Porter, Edison Welding institute; J.Allen Cote, General Dynamics Electric Boat; Timothy D. Gifford, VRSim; and Wim Lam, FCS Controls, Estimated Jan. 2005.
Choquet, Claude; "ARC + Today's virtual reality solution for welders" Internet Page , Jan. 1, 2008.
"High Performance Computer Architectures_ A Historical Perspective," downloaded May 5, 2016.
http://homepages.inf.ed.ac.uk/cgi/rni/comparch. pl?Paru/perf.html,Paru/perf-f.html,Paru/menu-76.html.
Adams, et al., "Adaptively sampled particle fluids," ACM SIGGRAPH 2007 papers, Aug. 5-9, 2007, San Diego, California.
Aidun, D., "Influence of Simulated High-g on the Weld Size of Al—Li Alloy" Elevator Science Ltd.; 2001; 4 pages.
Aiteanu et al., "Generation and Rendering of a Virtual Welding Seam in an Augmented Reality Training Environment" Proceedings of the Sixth IASTED International Conference, Aug. 2006, 8 pages.
Aiteanu, "Virtual and Augmented Reality Supervisor for a New Welding Helmet" Dissertation Nov. 15, 2005.
Aiteanu, et al., "A Step Forward in Manual Welding:; Demonstration of Augmented Reality Helmet" Institute of Automation, University of Bremen,; Germany, Proceedings of the Second IEEE and ACM International Symposium on Mixed and; Augmented Reality; 2003; 2 pages.
Aiteanu, et al., "Computer-Aided Manual Welding Using an Augmented; Reality Supervisor" Sheet Metal Welding Conference XII, Livonia, MI, May 9-12, 2006, 14 pages.
American Welding Society Advance Program of Programs and Events. Nov. 11-14, 2007. 31 pages. Chicago, IL.
American Welding Society Detroit Section, "Sheet Metal Welding Conference XII", May 2006, 11 pages.
American Welding Society, "Vision for Welding Industry"; 41 pages, Estimated Jan. 1998.
American Welding Society, http://www.nsrp.org/6-presentations/WDVirtual_Welder. pdf (Virtual Reality Welder Training,; Project No. SI051, Navy ManTech Program, Project Review for Ship Tech 2005); 22 pages.; Biloxi, MS.
American Welding Society, https://app.aws.org/conferences/defense/live index.html (AWS Welding in the Defense; Industry conference schedule, 2004); 12 pages.
American Welding Society, https://app.aws.org/w/r/www/wj/2005/03/WJ_2005_03.pdf (AWS Welding Journal, Mar. 2005; (see, e.g., p. 54)).; 114 pages.
American Welding Society, https://app.aws.org/wj/2004/04/052/njc (AWS Virtual Reality Program to Train Welders for; Shipbuilding, workshop information, 2004); 7 pages.
American Welding Society, https://app.aws.org/wj/2007/11/WJ200711.pdf (AWS Welding Journal, Nov. 2007); 240 pages.
American Welding Society, Welding Handbook, Welding Science & Technology, Ninth Ed., Copyright 2001. Appendix A "Terms and Definitions".
ARC+—Archived Press Release from WayBack Machine from Jan. 31, 2008-Apr. 22, 2013, Page, https://web.archive.org/web/20121006041803/http://www.123certification.com/en/article_press/index.htm, Jan. 21, 2016, 3 pages.
Kenneth Fast; Virtual Welding—A Low Cost Reality Welder System training system phase II; NSRP ASE Technology Investment Agreement; Feb. 29, 2012; pp. 1-54.
ArcSentry Weld Quality Monitoring System; Native American Technologies, allegedly 2002, 5; pages.
ARVIKA Forum Vorstellung Projekt PAARi. BMW Group Virtual Reality Center. 4 pages.; Nuernberg. 2003.
Bargteil, et al., "A semi-lagrangian contouring method for fluid simulation," ACM Transactions on Graphics, 25(1), 2006.
Bargteil, et al., "A texture synthesis method for liquid animations," In Proceedings of the ACM SIGGRAPH/Eurographics Symposium on Computer Animation, Sep. 2006.
Catalina, et al., "Interaction of Porosity with a Planar Solid/Liquid Interface" ("Catalina"), Metallurgical and Materials Transactions, vol. 35A, May 2004, pp. 1525-1538.
Chentanez, et al., "Liquid simulation on lattice-based tetrahedral meshes." In ACM SIGGRAPH/Eurographics Symposium on Computer Animation 2007, pp. 219-228, Aug. 2007.
Chentanez, et al., "Simultaneous coupling of fluids and deformable bodies," In ACM SIGGRAPH/Eurographics Symposium on Computer Animation, pp. 83-89, Aug. 2006.
Clausen, et al., "Simulating liquids and solid-liquid interactions with lagrangian meshes," ACM Transactions on Graphics, 32(2):17:1-15, Apr. 2013. Presented at SIGGRAPH 2013.
CS Wave-Manual, "Virtual Welding Workbench User Manual 3.0" 2007.
CUDA Programming Guide Version 1.1, Nov. 29, 2007.
Da Dalto, et al. "CS Wave: Learning welding motion in a virtual environment" Published in Proceedings of the IIW International Conference, Jul. 10-11, 2008.
Feldman, et al., "Animating Suspended Particle Explosions". In Proceedings of ACM SIGGRAPH 2003, pp. 708-715, Aug. 2003.
Feldman, et al., "Fluids in deforming meshes" In ACM SIGGRAPH/Eurographics Symposium on Computer Animation 2005, Jul. 2005.
Fite-Georgel, "Is there a Reality in Industrial Augmented Reality?" 10th IEEE International Symposium on Mixed and Augmented Reality (ISMAR). 10 pages, allegedly 2011.
Foster, et al., "Realistic animation of liquids," Graphical Models and Image Processing, v.58 n.5, p. 471-483, Sep. 1996.
Foster, et al., "Practical animation of liquids," Proceedings of the 28th annual conference on Computer graphics and interactive techniques, p. 23-30, Aug. 2001.
Bender Shipbuilding and Repair Co. Virtual Welding—A Low Cost Virtual Reality Welding; Training System. Proposal submitted pursuant to MSRP Advanced Shipbuilding Enterprise; Research Announcement, Jan. 23, 2008. 28 pages, See also, http://www.nsrp.org/6-; Presentations/WD/020409 Virtual Welding Wilbur.pdf.
Goktekin, et al., "A Method for Animating Viscoelastic Fluids". ACM Transactions on Graphics (Proc. of ACM SIGGRAPH 2004), 23(3):463-468, 2004.

(56) References Cited

OTHER PUBLICATIONS

Graham, "Texture Mapping" Carnegie Mellon University Class 15-462 Computer graphics, Lecture 10 dated Feb. 13, 2003; 53 pages.
Grahn, A., "Interactive Simulation of Contrast Fluid using Smoothed Particle Hydrodynamics," Jan. 1, 2008, Master's Thesis in Computing Science, Umeå University,Department of Computing Science, Umeå, Sweden.
Hillers, et al., "Augmented Reality—Helmet for the Manual; Welding Process" Institute of Automation, University of Bremen, Germany; 21 pages, Estimated Jan. 2004.
Hillers, et al., "Direct welding arc observation without harsh flicker," 8 pages, allegedly FABTECH International and AWS welding show, 2007.
Hillers, et al., "Real time Arc-Welding Video Observation System." 62nd International Conference of IIW, Jul. 12-17, 2009, 5 pages Singapore 2009.
Hillers, et al., "TEREBES:; Welding Helmet with AR Capabilities", Institute of Automatic University Bremen; Institute of; Industrial Engineering and Ergonomics, 10 pages, alleqedlv 2004.
Holmberg et al, "Efficient modeling and rendering of turbulent water over natural terrain," In Proceedings of the 2nd international conference on Computer graphics and interactive techniques in Australasia and South East Asia (Graphite '04) 2004.
Sun Yaoming; Application of Micro Computer in Robotic Technologies; Science and Technology Literature Press Catalogue of New Books of Science and Technology; Sep. 1987, pp. 360-363.
Hu et al. "Heat and mass transfer in gas metal arc welding. Part 1: the arc" found in ScienceDirect, International Journal of Heat and Mass transfer 50 (2007) 833-846 Available on Line on Oct. 24, 2006 http://web.mst.edu/~tsai/publications/Hu-IJHMT-2007-1-60.pdf.
Impact Welding: examples from current and archived website, trade shows, etc. See, e.g.,; http://www.impactweldinq.com. 53 pages, estimated Jan. 2000.
Irving, et al., "Efficient simulation of large bodies of water by coupling two and three dimensional techniques," ACM SIGGRAPH 2006 Papers, Jul. 30-Aug. 3, 2006, Boston, Massachusetts.
Jeffus, "Welding Principles and Applications" Sixth Edition, 2008, 10 pages.
Kass, et al., "Rapid, Stable Fluid Dynamics for Computer Graphics," Proceedings of SIGGRAPH '90, in Computer Graphics, vol. 24, No. 4, pp. 49-57, 1990.
Klingner, et al., "Fluid animation with dynamic meshes," In Proceedings of ACM SIGGRAPH 2006, pp. 820-825, Aug. 2006.
Kobayashi, et al., "Skill Training System of Manual Arc Welding by Means of Face-Shield-Like HMD and Virtual Electrode" ("Kobayashi 2003"), Entertainment Computing, vol. 112 of the International Federation for Information Processing (IFIP), Springer Science +Business Media, New York, copyright 2003, pp. 389-396.
Lincoln Global, Inc., "VRTEX 360: Virtual Reality Arc Welding Trainer" Brochure (2015) 4 pages.
Moore, "No exponential is forever: but 'Forever' can be delayed!," IEEE International Solid-State Circuits Conference, 2003.
Müller, et al., "Particle-based fluid simulation for interactive applications," Proceedings of the 2003 ACM SIGGRAPH/Eurographics symposium on Computer animation, Jul. 26-27, 2003, San Diego, California.
Müller, et al., "Point Based Animation of Elastic, Plastic and Melting Objects," Eurographics/ACM SIGGRAPH Symposium on Computer Animation (2004).
Nealen, A., "Point-Based Animation of Elastic, Plastic, and Melting Objects," CG topics, Feb. 2005.
Nordruch, et al., "Visual Online Monitoring of PGMAW Without a Lighting Unit", Jan. 2005.
O'Brien et al.,"Dynamic Simulation of Splashing Fluids". In Proceedings of Computer Animation 95, pp. 198-205, Apr. 1995.
P/NA.3 Process Modelling and Optimization; Native American Technologies, allegedly 2002,; 5 paqes.
Penrod, "New Welder Training Tools." EWI PowerPoint presentation; 16 pages allegedly 2008.
Phar, "GPU Gems 2 Programming Techniques for High-Performance Graphics and General-Purpose Computation," 2005, 12 pages.
Premoze, et al., "Particle-based simulation of fluids," Comput. Graph. Forum 22, 3, 401-410, 2003.
Rasmussen, et al., "Directable photorealistic liquids," Proceedings of the 2004 ACM SIGGRAPH/Eurographics symposium on Computer animation, Aug. 27-29, 2004, Grenoble, France.
Kobayashi, et al., "Simulator of Manual Metal Arc Welding with Haptic Display" ("Kobayashi 2001"), Proc. of the 11th International Conf. on Artificial Reality and Telexistence (ICAT), Dec. 5-7, 2001, pp. 175-178, Tokyo, Japan.
Renwick, et al., "Experimental Investigation of GTA Weld Pool Oscillations" Welding Research—Supplement to the Welding Journal, Feb. 1983, 7 pages.
Sandor, et al., "Lessons Learned in Designing Ubiquitous Augmented; Reality User Interfaces." 21 pages, allegedly from Emerging Technologies of Augmented; Reality: Interfaces Eds. Haller, M.; Billinghurst, M.; Thomas, B. Idea Group Inc. 2006.
Sandor, et al., "PAARTI: Development of an Intelligent Welding Gun for; BMW." PIA2003, 7 pages, Tokyo. 2003.
Screen Shot of CS Wave Control Centre V3.0.0 https://web.archive.org/web/20081128081915/http:/wave.c-s.fr/images/english/snap_evolution4.jpg, Estimated Jan. 2007.
Screen Shot of CS Wave Control Centre V3.0.0 https://web.archive.org/web/20081128081817/http:/wave.c-s.fr/images/english/snap_evolution8.jpg, Estimated Jan. 2007.
Screen Shot of CS Wave Exercise 135.FWPG Root Pass Level 1 https://web.archive.org/web/20081128081858/http:/wave.c-s.fr/images/english/snap_evolution2.jpg, Estimated Jan. 2007.
Stam, J., "Stable fluids," Proceedings of the 26th annual conference on Computer graphics and interactive techniques, p. 121-128, Jul. 1999.
SWANTEC corporate web page downloaded Apr. 19, 2016. http://www.swantec.com/technology/numerical-simulation/.
Tamasi, T., "The Evolution of Computer Graphics," NVIDIA, 2008.
TEREBES: examples from http://www.terebes.uni-bremen.de.; 6 pages.
Thurey, et al., "Real-time BreakingWaves for Shallow Water Simulations," In Proceedings of the 15th Pacific Conference on Computer Graphics and Applications (PG '07) 2007.
Tonnesen, D., "Modeling Liquids and Solids using Thermal Particles," Proceedings of Graphics Interface'91, pp. 255-262, Calgary, Alberta, 1991.
Tschirner, et al., "Virtual and Augmented Reality for Quality Improvement of Manual Welds" National Institute of Standards and Technology, Jan. 2002, Publication 973, 24 pages.
Tschirner, et al, "A Concept for the Application of Augmented Reality in Manual Gas Metal Arc Welding." Proceedings of the International Symposium on Mixed and Augmented Reality; 2 pages; 2002.
Vesterlund, M., "Simulation and Rendering of a Viscous Fluid using Smoothed Particle Hydrodynamics," Dec. 3, 2004, Master's Thesis in Computing Science, Umeå University, Department of Computing Science, Umeå, Sweden.
Virtual Welding: A Low Cost Virtual Reality Welder Training System, NSRP RA Jul. 2001—BRP Oral Review Meeting in Charleston, SC at ATI, Mar. 2008.
VRSim Inc. "About Us—History" www.vrsim.net/history, 2016, 1 page.
VRSim Powering Virtual Reality, www.lincolnelectric.com/en-us/equipmenl/lraining- equipmenl/Pages/powered-by-; 'rsim.aspx, 2016, 1 page.
Wahi, et al., "Finite-Difference Simulation of a Multi-Pass Pipe Weld" ("Wahi"), vol. L, paper 3/1, International Conference on Structural Mechanics in Reactor Technology, San Francisco, CA, Aug. 15-19, 1977.
Wang, et al., "Impingement of Filler Droplets and Weld Pool During Gas Metal Arc Welding Process" International Journal of Heat and Mass Transfer, Sep. 1999, 14 pages.
Webster's II new college dictionary, 3rd ed., Houghton Mifflin Co., copyright 2005, Boston, MA, p. 1271, definition of "wake.".

(56) References Cited

OTHER PUBLICATIONS

Yao, et al., "Development of a Robot System for Pipe Welding" 2010 International Conference on Measuring Technology and Mechatronics Automation. Retrieved from theInternet:http://ieeexplore.ieee.org/stamp/stamp.jsp?tp=&arnumber=5460347&tag=1; pp. 1109-1112.
Yoder, Fletcher, Opinion U.S. Pat. No. Re. 45,398 and U.S. Appl. No. 14/589,317, including Appendices ; dated Sep. 9, 2015; 1700 pages.
Office Action from U.S. Appl. No. 14/526,914 dated Feb. 3, 2017.
International Search Report for PCT/IB2009/00605, dated Apr. 2005.
International Search Report for PCT/IB2014/001796, dated Mar. 24, 3016; 8 pages.
International Search Report for PCT/IB2015/000161, dated Aug. 25, 2016; 9 pages.
International Search Report for PCT/IB2015/000777, dated Dec. 15, 2016; 11 pages.
International Search Report for PCT/IB2015/000814 dated Dec. 15, 2016; 9 pages.
International Preliminary Report from PCT/IB2015/001084 dated Jan. 26, 2017.
Petition for Inter Partes Review of U.S. Pat. No. 8,747,116; IPR 2016-00749; Apr. 7, 2016; 70 pages.
Declaration of Edward Bohnart, Apr. 27, 2016, exhibit to IPR 2016-00749.
Declaration of Dr. Michael Zyda, May 3, 2016, exhibit to IPR 2016-00749.
Trial Denied IPR Proceeding of U.S. Pat. No. 8,747,116; IPR 2016-00749; Sep. 21, 2016; 21 pages.
Petition for Inter Partes Review of U.S. Pat. No. Re. 45,398; IPR 2016-00840; Apr. 18, 2016; 71 pages.
Declaration of AxelGraeser, Apr. 17, 2016, exhibit to IPR 2016-00840; 88 pages.
Decision Denying Request for Rehearing of U.S. Pat. No. Re. 45398; IPR 2016-00840; Nov. 17, 2016; 10 pages.
Petition for Inter Partes Review of U.S. Pat. No. 8,747,116; IPR 2016-01568; Aug. 9, 2016; 75 pages.
Decision Termination Proceeding of U.S. Pat. No. 8,747,116; IPR 2016-01568; Nov. 15, 2016; 4 pages.
Petition for Inter Partes Review of U.S. Pat. No. 9,293,056; IPR 2016-00904; May 9, 2016; 91 pages.
Declaration of Edward Borman, Apr. 27, 2016, exhibit to IPR 2016-00904; 22 pages.
Declaration of Dr. Michael Zyda, May 3, 2016, exhibit to IPR 2016-00904; 76 pages.
Decision Trial Denied IPR Proceeding of U.S. Pat. No. 9,293,056; IPR 2016-00904; Nov. 3, 2016; 15 pages.
Petition for Inter Partes Review of U.S. Pat. No. 9,293,057; IPR 2016-00905; May 9, 2016; 87 pages.
Declaration of Edward Borman, Apr. 27, 2016, exhibit to IPR 2016-00905; 23 pages.
Declaration of Dr. Michael Zyda, May 3, 2016, exhibit to IPR 2016-00905; 72 pages.
Decision Trial Denied IPR Proceeding of U.S. Pat. No. 9,293,057; IPR 2016-00905; Nov. 3, 2016; 21 pages.
*Lincoln Electric Company et al v. Seabery Soluciones SL et al*—1:15-cv-01575-DCN—Complaint filed Aug. 15, 2015.
*Lincoln Electric Company et al v. Seabery Soluciones SL et al*—1:15-cv-01575-DCN—Amended Answer filed Mar. 1, 2016 by Seabery North America.
*Lincoln Electric Company et al v. Seabery Soluciones SL et al*—1:15-cv-01575-DCN—Amended Answer filed Mar. 1, 2016 by Seabery Soluciones SL.
*Lincoln Electric Company et al v. Seabery Soluciones SL et al*—1:15-cv-01575-DCN—Amended Answer filed Mar. 22, 2016 by Lincoln Electri c Company.
*Lincoln Electric Company et al v. Seabery Soluciones SL et al*—1:15-cv-01575-DCN—Answer filed Mar. 22, 2016 by Lincoln Global Inc.
Exhibit B from Declaration of Morgan Lincoln in *Lincoln Electric Co. et al. v. Seabery Soluciones, S.L. et al.*, Case No. 1:15-cv-01575-DCN, dated Dec. 20, 2016, 5 pages.
European Examination Report for Application No. 17001820.4; dated May 16, 2019.
The Lincoln Electric Company, Check Point Operator's Manual, 188 pages, issue date Aug. 2015.
William Huff, Khoi Nguyen,"Computer Vision Based Registration Techniques for Augmented Reality", Colorado School of Mines, Division of Engineering, Proceedings of Intellectual Robots and Computer Vision XV, pp. 538-548; SPIE vol. 2904, Nov. 18-22, 1996, Boston MA.
European Search Report for European Patent Application 10860823.3-1702, pp. 1-8, dated Jun. 6, 2017.
Benkai Xie, Qiang Zhou and Liang Yu; A Real Time Welding Training System Base on Virtual Reality; ONEW 360; Wuhan University of Technology; IEEE Virtual Reality Conference; Mar. 23-27, 2015.
U.S. Appl. No. 12/504,870 (U.S. Pat. No. 9,483,959), filed Jul. 17, 2009 (Patented Nov. 1, 2016), Welding Simulator.

\* cited by examiner

A GAME PLAYED ON A PROCESSOR BASED COMPUTING DEVICE EXECUTING CODED INSTRUCTIONS, COMPRISING THE STEPS OF:

PROVIDING PROCESSING MEANS OPERABLE TO EXECUTE CODED INSTRUCTIONS FOR GENERATING AN INTERACTIVE VIRTUAL ENVIRONMENT, WHEREIN SAID PROCESSING MEANS RECEIVES INPUT FROM AN ASSOCIATED INPUT DEVICE.

CREATING A VIRTUAL ARTICLE WITHIN VIRTUAL ENVIRONMENT HAVING AN OPERATIONAL STATE THAT IS CHANGEABLE BETWEEN OPERATIVE AND INOPERATIVE.

ESTABLISHING A GAME OBJECTIVE TO CHANGE THE OPERATIONAL STATE OF THE VIRTUAL ARTICLE BY A VIRTUAL WELDING OPERATION.

DIRECTING AN END USER TO PERFORM A VIRTUAL WELDING OPERATION THAT CHANGES THE OPERATIONAL STATE OF THE VIRTUAL ARTICLE.

FIG. 6

WELDING SIMULATOR

CROSS REFERENCE TO RELATED APPLICATION

This application is a continuation of U.S. patent application Ser. No. 12/504,870, filed Jul. 17, 2009, now allowed, which claims priority to U.S. Provisional Application No. 61/090,794, filed Aug. 21, 2008 which is incorporated herein by reference in its entirety.

TECHNICAL FIELD

The present invention pertains to methods and systems for introducing potential new workers to the field of welding, and more particularly, to computer generated virtual environments that simulate welding processes.

BACKGROUND OF THE INVENTION

In recent decades, welding has become a dominant process in the manufacture and construction of various products. Applications for welding are widespread and used throughout the world for the construction of ships, buildings, bridges, vehicles, and pipe lines, to name a few examples. Many welding tasks can be automated reducing the need for skilled labor. However, automated welding applications must be set up and managed by knowledgeable welders. Other welding applications aren't confined to a factory floor. Applications, including the construction of pipe lines or buildings, are welded in the field and require the mobility of an experienced welder. Accordingly, there is ongoing need for trained personnel who can adapt to the challenges of welding processes.

The demand for skilled welders remains high, despite reductions in manufacturing, in many regions of the world. In the United States, the average age of the welding professional is increasing, with many individuals approaching retirement age. Over the next decade, the number of available experienced welders is expected to significantly decline as workers retire from the welding profession. Many young people entering the workforce today are choosing advanced education over skilled trades and many of those workers entering the trades are dissuaded from a career in welding despite good working conditions. Programs and organizations promoting S.T.E.M. (Science Technology Engineering Math) and S.T.E. (Science and Technology/Engineering) education are valuable in revitalizing the interest of individuals in technology related fields.

BRIEF SUMMARY

The embodiments of the present invention pertain to a computer program product and processor based computing system that provides processing means for executing coded instructions and input means for interacting with said processing means to create a virtual welding environment. The system establishes an objective to change a functional or operational state of a virtual article, and directs the end user to perform at least one virtual welding operation for changing its functional state.

BRIEF DESCRIPTION OF THE DRAWINGS

FIG. 6 is a block diagram depicting a method of a game played on a processor based computing device executing coded instructions.

DETAILED DESCRIPTION OF THE INVENTION

Figure 1:
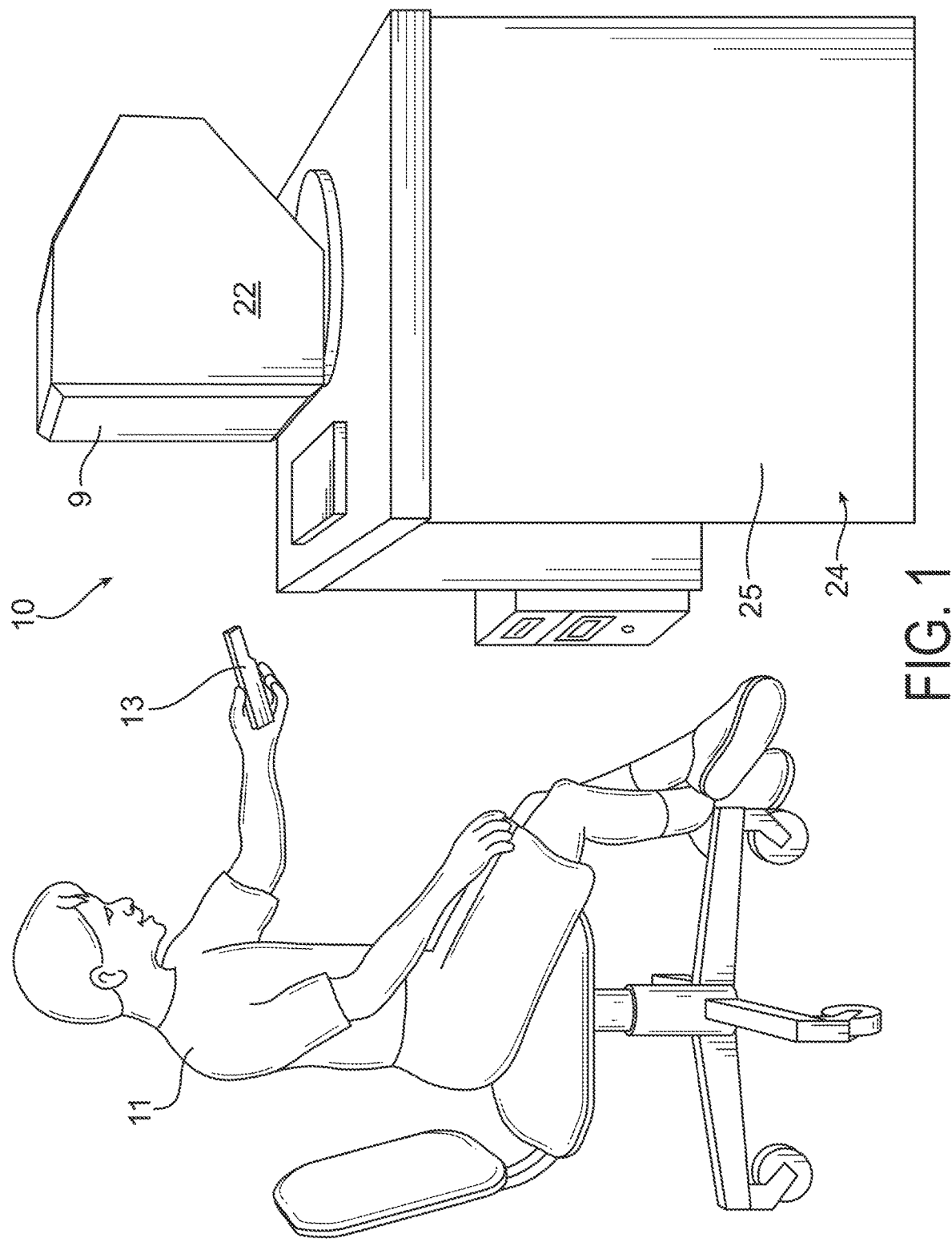
FIG. 1 is a perspective view of a simulating device and end user according to the embodiments of the subject invention.
Figure 2:
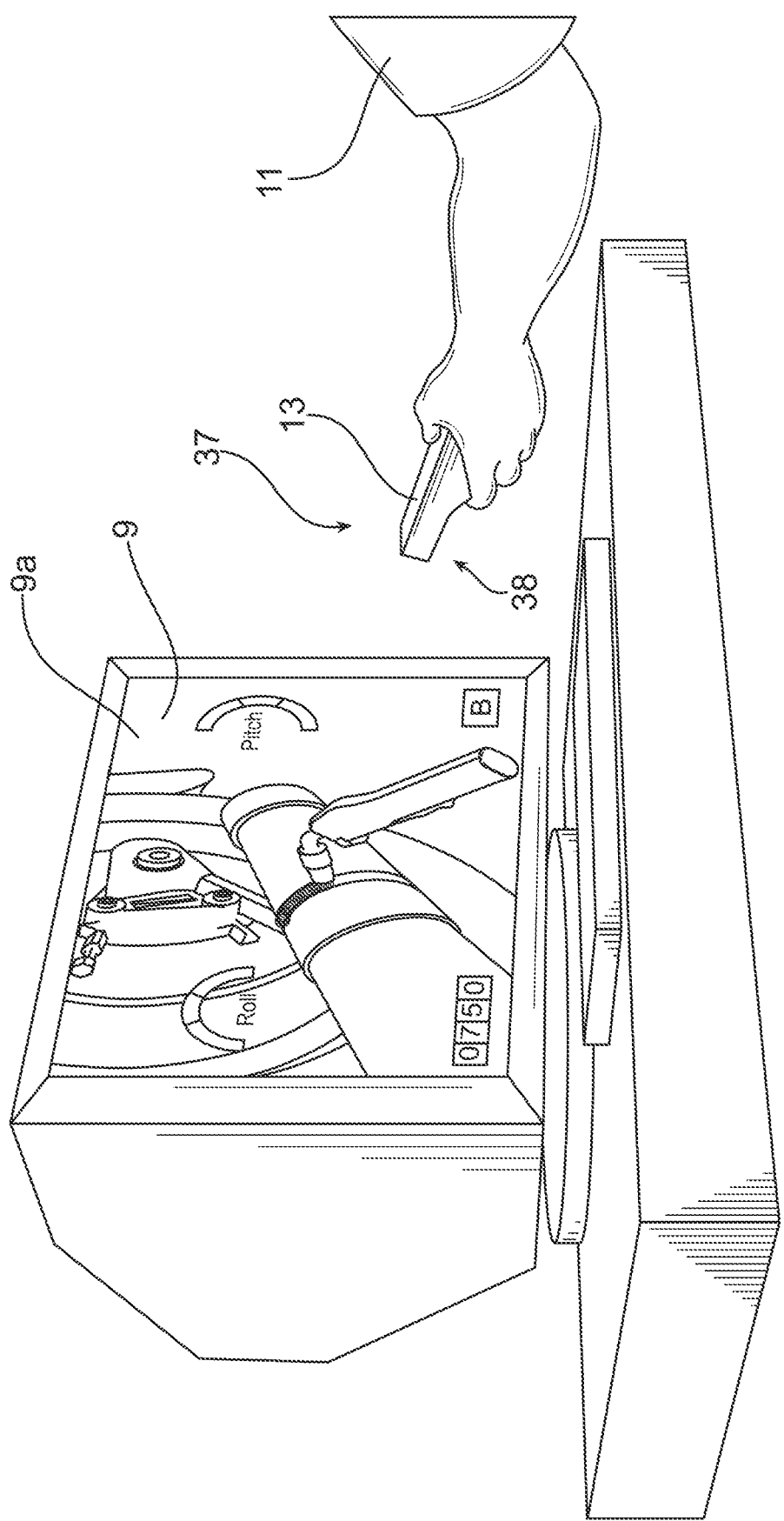
FIG. 2 is a close up perspective view of a simulating device depicting a virtual environment according to the embodiments of the subject invention.

Referring now to the drawings wherein the showings are for purposes of illustrating embodiments of the invention only and not for purposes of limiting the same, FIGS. 1 and 2 shows a simulator or simulating device depicted generally at 10. The simulating device 10 generates a virtual environment 9 that simulates a three dimensional setting, which may be an industrial or commercial setting utilizing one or more manufacturing processes. The virtual environment 9 may be depicted on an imaging device 22 as viewed by an end user 11. In particular, the simulating device 10 may depict a virtual environment 9 that facilitates interaction between the end user 11 and one or more virtual articles 16. An input device 13 may be included that senses activity when manipulated by the end user 11. Data from the input device 13 may be communicated to the simulating device 10 and is used to maneuver objects with the virtual environment 9 in or near real time. In one embodiment, the simulating device 10 functions to generate one or more virtual articles 16 that can be acted upon by virtual tools 26 generated in a similar manner. It follows that the virtual tools 26 may be employed in the virtual environment 9 when the input device 13 is maneuvered by the end user 11 in the real world.

The simulating device 10 may generate a virtual environment 9 having virtual articles 16 that resemble components of a particular manufacturing or construction process. In one embodiment, the virtual environment 9 may comprise a welding environment 9a depicting one or more articles for assembly together via a welding process. Accordingly, the virtual tools 26 may comprise a welder 32 and welding torch 34. In this manner, the simulating device 10 displays virtual articles 16 being welded together by a virtual welder 32 as interactively controlled by the end user 11. The simulating device 10 may be realized as a training platform for exposing individuals to a particular manufacturing process, or may be realized as a game played to achieve a stated objective, both of which will be discussed further in a subsequent paragraph. It is expressly noted that while the embodiments of the present invention are described in the context of a virtual welding environment 9a and one or more welding process, persons of skill in the art will understand its application to other industrial or commercial processes.

With continued reference to FIG. 1, the simulating device 10 may be constructed of electronic hardware comprising a processor based computing device 24 operable to run, i.e. execute, a computer program product. In one embodiment, the processor based computing device 24 comprises a micro-computer in any of various configurations including but not limited to: a laptop computer, a desktop computer, work station, server or the like. Alternatively, the processor based computing device 24 may comprise a gaming system like that manufactured by Nintendo®, Microsoft® or Sony®. In this manner, the processor based computing device 24 may be a commercially available system readily available for purchase by an end user 11. The processor based computing device 24 may include one or more logic processor based systems 25, or logic processors 25, such as a programmable microprocessor, although any type of logic processor 25 may be utilized in the simulating device 10 without departing from the intended scope of coverage of the embodiments of the subject invention. The processor based computing device 24 may further include support circuitry including electronic memory, such as RAM or ROM along with other peripheral support circuitry that facilitate operation of the logic processor(s) 25. Additionally, the processor based computing device 24 may include data storage, examples of which include hard disk drives, optical storage devices and/or flash memory for the storage and retrieval of data in a manner well known in the art. Thus, the processor based computing device 24 may be programmable and operable to execute coded instructions, as also referred to as programmed algorithms, which may be a computer program product written in a high or low level programming language. It is noted that any form of programming or type of programming language may be used to code algorithms as executed by the simulating device 10 for simulating the virtual environment 9, 9a.

The simulating device 10 and, more particularly, the processor based computing device 24 may be communicated to and used in conjunction with other similarly or dissimilarly constructed systems. Input to and output from the simulating device 10, termed I/O, may be facilitated in this embodiment by networking hardware including wireless as well as hard wired (directly connected) devices. Communication between simulating devices 10, or systems, may be accomplished remotely as through a network, like a wide area network (WAN) or local area network (LAN) via network hubs, repeaters, or by any means chosen with sound judgment. Communications may be established through, but are not limited to: direct connection of multiple simulating devices 10, web-based connectivity, virtual private networks, and/or SSL (Secure Sockets Layer) encrypted communication. It is noted that the relationship between simulating devices 10 may be peer-to-peer, client-server, or any hybrid combination thereof without departing from the scope of coverage of the embodiments of the subject invention. In this manner, information may be transmitted between systems 10 as is useful for simulating or interacting with the virtual environment 9, 9a. In one embodiment, network communications may be used to download virtual articles 16 or virtual tools 26 for changing the game scenario. Alternatively, new environments may be downloaded for training a different manufacturing process, the details of which will be discussed further below. It is further contemplated in another embodiment that the simulating device 10 may generate a virtual environment 9, 9a that may be acted upon by multiple end users 11 each working from the same system or separate systems networked together. Still, any manner of communicating one or more simulating devices 10 together may be utilized without departing from the intended scope of coverage of the embodiments of the subject invention.

With continued reference to FIGS. 1 and 2, the simulating device 10 may include an imaging device 22 for displaying the virtual environment 9, which may be a virtual welding environment 9a. The imaging device 22 may comprise a display screen operable to display images generated by the processor based computing device 24 and the computer program product. In one embodiment, the display screen may include a computer monitor and/or television screen comprised of CRT (Cathode Ray Tube) or LCD (Liquid Crystal Display), although any type of monitor, screen, display, or projection device may be utilized as is appropriate for the embodiments of the subject invention. Information for generating the images on the display screen may be stored in memory within the processor based computing device 24. As memory is updated or changed during execution of the computer program product, images on the display screen may be dynamically changed in real time. Still any method or means for displaying the virtual environment 9, 9a on the imaging device 22 may be chosen as is appropriate for use with the embodiments of the subject invention.

Figure 3:
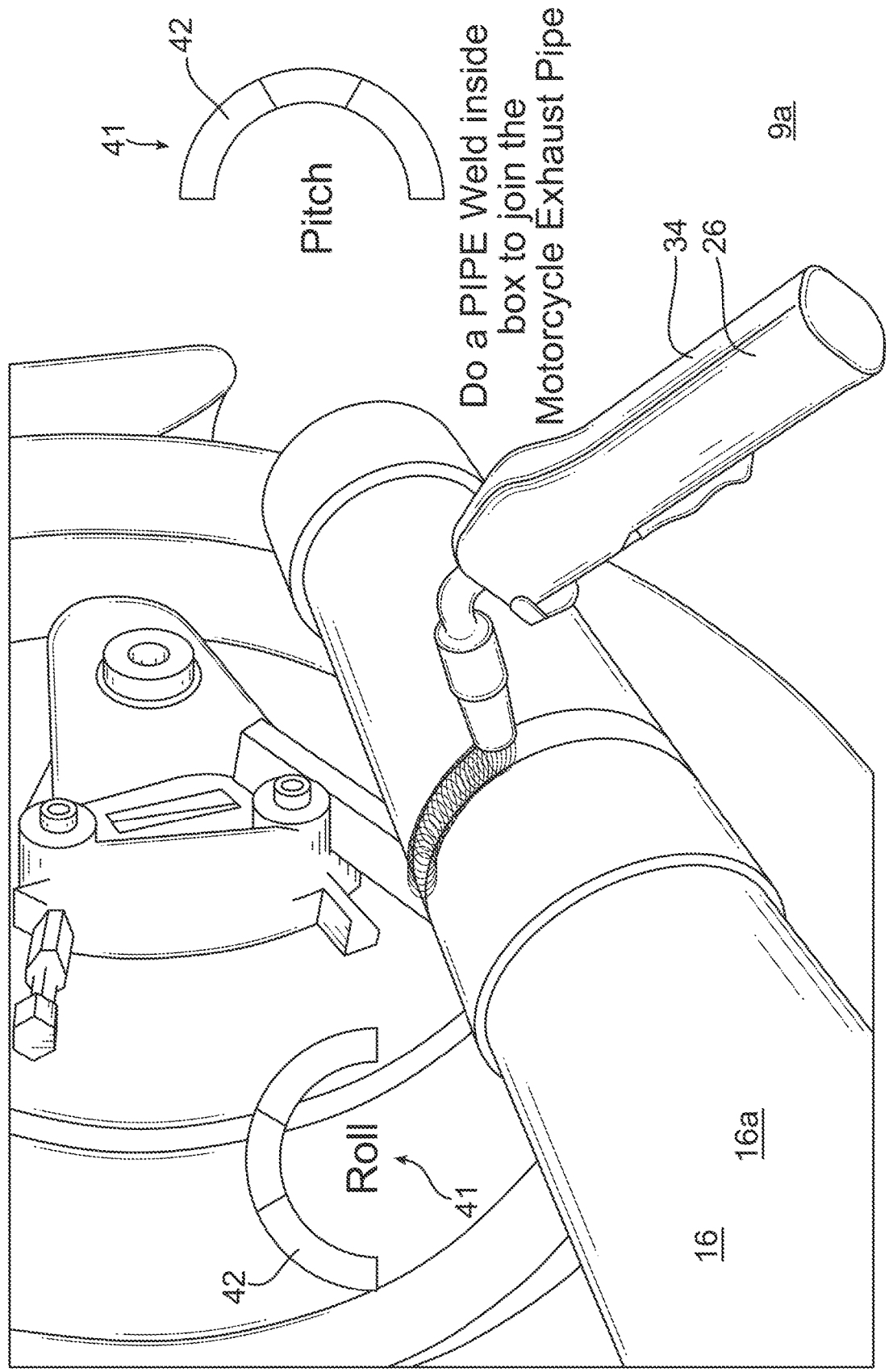
FIG. 3 is an image of a virtual environment showing a virtual article according to the embodiments of the subject invention.

With reference now to FIGS. 2 and 3, the input device 13 may function to interface activity in the real world with the virtual environment 9. In particular, the input device 13 senses the actions of the end user 11 and translates those actions into data recognizable by the simulating device 10. The data is communicated to the logic processors 25 and may be used to interactively engage the virtual tools 26 and/or the virtual articles 16. In one embodiment, the computer program product processes the data and makes changes to the virtual environment 9 in real time. In this manner, as the end user 11 manipulates the input device 13 in three dimensional space, objects in the virtual environment 9, 9a move in a corresponding manner, i.e. in direct relationship to movement of the input device 13. For example, the end user 11 may visualize one or more virtual objects on the imaging device 22, including a virtual representation of a real world tool. Accordingly, the end user 11 may move the input device 13 in a particular direction resulting in a corresponding movement of the virtual object. In the welding embodiment illustrated herein, the input device 13 may represent the welding torch 34. Movement of the input device 13 therefore translates into movement of the virtual welding torch 34 in the virtual environment 9a. The input device 13 may include switches that activate the virtual welder thereby initiating the welding process. The end user 11 may then guide the input device 13 along a trajectory that coincides with the weld joint as depicted on the imaging device 22.

Still referring to FIG. 2, the input device 13 may include one or more sensors 37 that detect movement and/or orientation in three dimensional space. The sensors 37 may be integrated into the input device 13 and positioned at various locations for detecting different types of activity. For example, the sensor 37, or sensors, may detect spatial orientation, i.e. the direction that an object is pointing, as mentioned above. The sensors 37 may also detect motion in a particular direction. Additionally, the sensors 37 may detect velocity and/or acceleration, which may encompass not only the magnitude of change in position or speed, but also direction. However, any type of activity related to the input device 13 may be detected by the sensors 37 without departing from the intended scope of coverage of the embodiments of the subject invention. Examples of sensors 37 may include but are not limited to: inertial sensors like accelerometers, proximity sensors, infrared sensors, photoelectric and optical sensors, and the like. It is noted here that the input device 13 may further incorporate switching means 38 for interfacing with the virtual environment 9. The switching means 38 may include: pushbuttons, triggers or switches. In this way, virtual activity may be initiated, interrupted, or terminated as desired by depressing or releasing the switch respectively. Illustratively, the virtual welder 34 may be turned "on" or "off" by depressing or releasing a trigger switch. It is to be construed that any type, quantity or grouping of sensors 37 or switching means 38 may be integrated into the input device 13 as chosen with sound judgment. Still other means of tracking movement of the input device 13 may be included as a separate unit that resides in an adjacent region proximal to the coupon. Position and/or orientation data generated by the tracker, i.e. tracking means, may be used in conjunction with or in place of data generated by the input device 13.

In one embodiment, the input device 13 may be commercially available for purchase and use. One example may include a manually moveable device, like a computer mouse having an optical sensor for detecting movement along an adjacent surface. Another example of input device 13 may comprise a gaming joystick or controller, which may include a connector for plugging into an I/O port or may include wireless means for communication. The Wii wireless controller manufactured by Nintendo® is one exemplary type of input device, although other commercially available controller devices may be utilized as are suitable for use with a particle processor based computing device 24. Other embodiments contemplate customized controllers, which may be fashioned to physically look like a particular virtual tool 26, e.g. a welding torch 34. Interaction with the simulating device 10 is thereby enhanced by a physical object having a real world feel and look that resemble the virtual tools 26 depicted on the imaging device 22. It is noted that the customized controller may be substantially similar in size, shape and/or weight to the real world tool for which the controller is intended to resemble. Other embodiments include an attachment that connects to the commercially available input device 13 and resembles a particular virtual tool 26 to enhance the end user's experience in interacting with the virtual environment 9. In one embodiment, the attachment may be an overlaying component and/or a component that attaches to and extends from the input device 13. However, it is expressly noted that any configuration of customized controller or attachment may be chosen as is appropriate for use with the embodiments of the subject invention. Accordingly, at least part of the simulating device 10 may be packaged as a kit for use with any type of processor based computing device 24, commercially available or otherwise. In another embodiment of the subject invention, the kit may include a welding coupon that may resemble a virtual article 16 displayed in the virtual environment 9, 9a. Accordingly, the welding coupon may function as a guide in the real world for assisting the end user in acting in the virtual environment 9, 9a. The kit may also comprise tracking means like that mentioned above. In other words, a tracking unit may be provided in addition to the input device 13 for sensing the end user's 11 movement during play.

Figure 4:
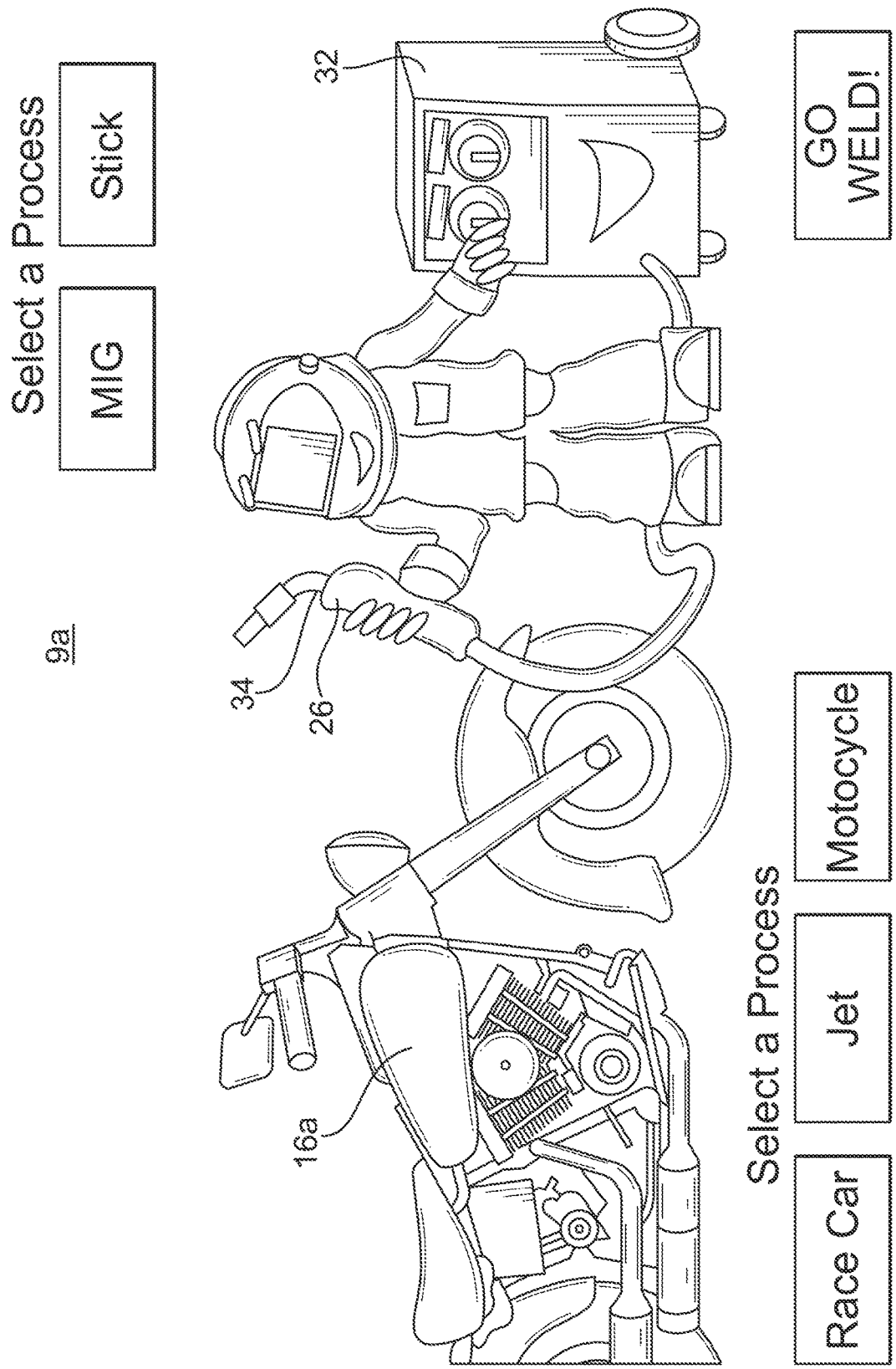
FIG. 4 is an image of a virtual environment showing a virtual article and user interface screen according to the embodiments of the subject invention.

With reference to FIGS. 3, 4 and 6, the simulating device 10 may comprise a game having a stated objective to be accomplished by the end user 11. In one particular embodiment, the game may comprise a welding game where the objective is to weld one or more virtual articles 16 together. Achieving the objective may require the end user 11 to perform a number of welds each to a predetermined level of quality. That is to say that the game facilitates user interaction with processor based computing device 24 via the input device 13 for satisfactorily performing one or more virtual welds in the virtual welding environment 9a. During play, the game presents the end user 11 with a scenario incorporating one or more themed virtual articles 16a. Illustratively, the scenario may relate to motorized vehicles and may depict a number of virtual components that can be welded together to assemble a functioning motorcycle or racecar. In another exemplary scenario a jet aircraft is simulated that is in need of repairs, which may require welding before taxiing down the runway and taking off. Other examples include building structures or bridges that require repair or construction before people occupy the building or the train crosses the bridge respectively. However, any scenario theme may be chosen without departing from the intended scope of coverage of the embodiments of the subject invention. It will be realized that the game rewards successful completion of the objective, in one manner, by graphically displaying the themed article functioning in its environment, e.g. the motorcycle drives away or the train crosses the bridge. The simulating device 10 also takes in account the personal interests of the end user 11. In one embodiment, the game gives the end user 11 the option of selecting a scenario that is familiar increasing his or her level of interest. Accordingly, the game may be programmed with multiple scenario options for appeal to a broad range of individuals.

From the aforementioned description, it follows that the themed virtual article 16a of the scenario has some deficiency that requires repair or assembly before becoming operational. During game initialization, i.e. game start up, the themed virtual article 16a may be instantiated having an inoperative state or, in other words, is created not working properly or not working at all. In the present examples, the initial "inoperative" state may be represented and simulated by one or more broken brackets, a stack of unassembled I-beams, a cracked pipe, or any repairable element fitting the scenario theme. Accomplishing the game objective therefore requires the end user 11 to interact with the virtual environment 9a to perform virtual welding that changes the operational state of the themed virtual article 16a. It is noted here that accomplishing the game objective may require successful completion of multiple levels of play. That is to say winning the game requires successfully changing the operational state of each virtual article 16a in every level of play.

At an introductory level, the game displays one or more virtual articles 16 that correspond to the scenario selected by the end user 11. The end user 11 is then instructed to perform a particular type of weld relating to the deficiency of the virtual article 16. It may be assumed that the end user 11 has little or no welding experience. Accordingly, a tutorial may be provided that presents information to the end user 11 about the welding process or welding techniques needed for achieving the objective for that level. Display of the tutorial may be initiated or controlled by the end user 11 via a graphical user interface (GUI), in one example, as selected by a "help" button. In the alternative, tutorial screens may automatically be presented if the end user's performance falls below a satisfactory level. In one exemplary manner, the instructions may be displayed in written form, an example of which may include a setup screen. Instructions may also be provided audibly and, more specifically verbally, to describe the process and/or motions needed to complete setup and a particular welding task. In either case, the instructions may be presented in one of a plurality of languages to accommodate individuals residing in different regions of the world. One embodiment is contemplated where the game graphically or pictorially presents tutorial information. In this instance, literacy of the end user 11 is not required to play the game.

Game play proceeds as the end user 11 engages the input device 13 to mimic movements characteristic of performing a weld. Progression through the game may depend on how well the end user 11 performs a virtual weld, which may relate to the level of virtual weld quality. In this manner, advancing to the next level, as will be discussed further in a subsequent paragraph, requires successful completion of the previous game stage. In making that determination, one or more parameters may be measured to determine the level of virtual weld quality. In processes well known in the real world, weld quality depends on many factors like the distance between the torch tip and the weld joint, which may vary with the type of welding process, the materials being welded, the welder settings, and the like. Corresponding real world parameters may be coded into the computer program product for judging the end user's 11 performance and for determining the quality of the virtual weld.

Completion of a particular game level may require the end user 11 to perform the one or more virtual welds to predetermined performance standards as determined by the computer program product. Performance parameters may be programmed into the computer program product that correlate to good welding practices and may consist of: weld torch 34 position, roll and pitch angles of orientation and travel speed. Sensor data from the input device 13 may be compared to preprogrammed parameters to determine whether or not the end user 11 has stayed within acceptable limits. In one particular embodiment, weld quality may be determined by monitoring the distance between the torch tip in relation to the center of the weld seam while maintaining proper pitch and roll angles during the virtual welding process. However, it is to be construed that other parameters may be utilized in determining if the end user 11 has successfully completed a virtual weld.

In one embodiment, the simulating device 10 provides or calculates a score resulting from game play. The score, which may also be a grade, may be derived from the performance data of the end user 11. Performance data may pertain to how well the end user 11 performs the virtual weld, that is to say how closely the end user 11 maintains the virtual tools 26 or welding torch 34 within limits for acceptable welding practices. Examples may include but should not be limited to, welding torch angle or distance to the virtual article 16 The score or grade may also be derived from end user selections made with respect to the problem-based scenarios as will be discussed further in a subsequent paragraph.

Simulating device 10 may provide feedback to help the end user 11 in performing the virtual welds. In the real world, a welder receives feedback by observing the weld bead as the torch travels along the weld joint. The simulating device 10 may similarly depict a virtual weld bead correlating to the end user's movement of the virtual welding torch 34. In one embodiment, the shape of the virtual weld bead is determined by factors including torch angle, travel speed and distance to the work piece, as well as welding power source settings, although other factors may be incorporated as is appropriate for use with the embodiments of the subject invention. In this manner, the end user 11 can make adjustments during the virtual welding process for laying down an acceptable weld bead thereby simulating real world activity.

Figure 5:
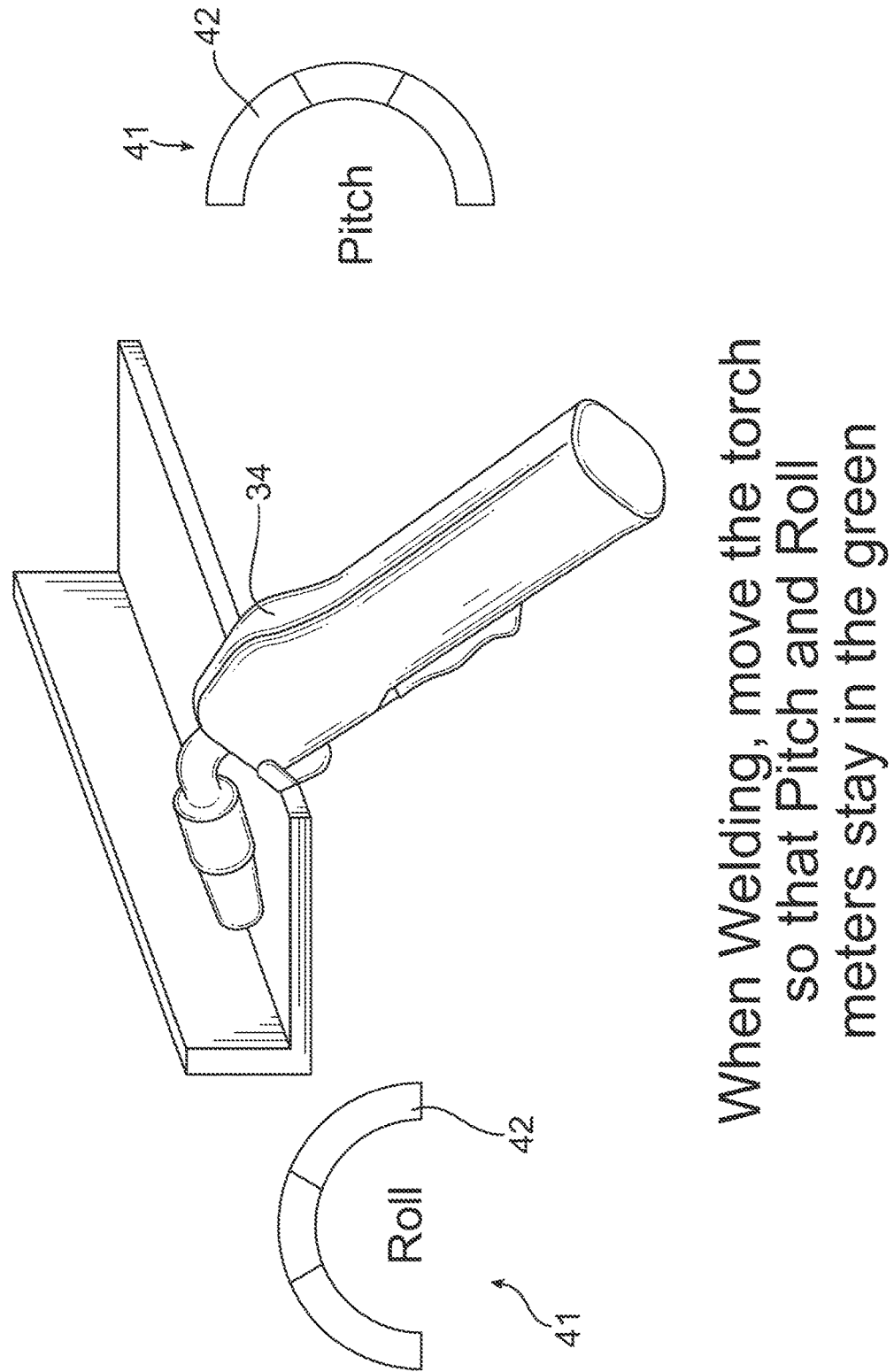
FIG. 5 is an image of a virtual environment showing a user interface screen according to the embodiments of the subject invention.

Referencing FIG. 5, to further assist the end user 11, performance guides 41 may be included that provide quantitative feedback on the position and orientation of the virtual welding torch 34. In one particular embodiment, "indicating bars" 42 are included that show the pitch and roll angles of the virtual welding torch 34. Other types of performance guides 41 are contemplated that display the distance between the torch tip and the weld joint. Additional welding parameters incorporated into the performance guide 41 will become apparent to those skilled in the art.

The performance guides 41 may display the actual numerical values of the torch position, which in the current embodiment shows pitch and roll angles. The values displayed may show the angles as measured from an absolute reference like the vertical or horizontal plane. Alternatively, the performance guides 41 may display angle values that relate to offsets from the ideal torch position or orientation. The performance guide 41 may indicate which values are outside the range for achieving an acceptable weld. In one embodiment, the performance guides 41 may flash, changer color and play an audible sound that indicates when the welding torch 34 is out of position. In this way, the end user 11, through repeated use, learns correct welding techniques. As the end user 11 gains experience, he or she will naturally maintain the welding torch 34 at the proper orientation throughout the entire welding process. At one point, it may no longer be necessary to display the performance guides 41. Accordingly, the computer program product may be programmed to selectively turn the guides 41 "on" or "off."

As previously mentioned, the game may incorporate different levels of play. The levels may be differentiated by scenario, i.e. by changes in the themed subject articles 16*a* being welded. Alternatively, the levels of play in a particular scenario may differ by the types of weld joints and/or the number of virtual article pieces to be welded together. For example, a more fundamental level may simulate welding a single lap joint embodied by overlaid frame components of building structure. Another level of play may simulate performing a pipe weld as found on a motorcycle tailpipe or pipeline. Still, other examples are contemplated wherein overhead or vertical butt joints are to be welded for repairing the frame of motor vehicle. At each game level, the welding objectives must each be performed to within predetermined quality boundaries in succession, before proceeding to the next level. In this way, basic welding skills may be taught by progressively introducing increasingly complicated weld joint configurations and more advanced welding techniques.

The game objective may be accomplished when the end user 11 successfully performs, i.e. meets or exceeds predetermined limits of weld quality for, all of the virtual welds in a given scenario. That is to say that the end user 11 performs each weld on every level to a minimum standard for quality. Alternative game objectives may be included that are accomplished by exceeding a virtual weld performance average over the various levels. Consequently some levels of play may be performed below the performance minimums with others commensurately above. The game objective is met as long as the weighted average for the entire game exceeds a predetermined minimum.

In judging the end user's 11 performance, the simulating device 10 may track the movements of the end users 11 through the input device 13 and compare the data with parameters stored in memory, or coded into the computer program product. The data and/or parameters may be stored in a database, or by any means of data storage chosen with sound judgment. In one embodiment, the simulating device 10 records and stores information about the end user's 11 performance for comparison at a time subsequent to the virtual activity. In other embodiments, comparison with the welding quality parameters is performed in real time with the results being dynamically displayed or catalogued for subsequent review. In addition to the data collected via the input device 13, other types of data may be captured, which include: time and date data, user name, scenario, as well as game status data. It will be appreciated that any type of data may be tracked and stored as needed for determining and reporting the results of game play.

Figure 7:
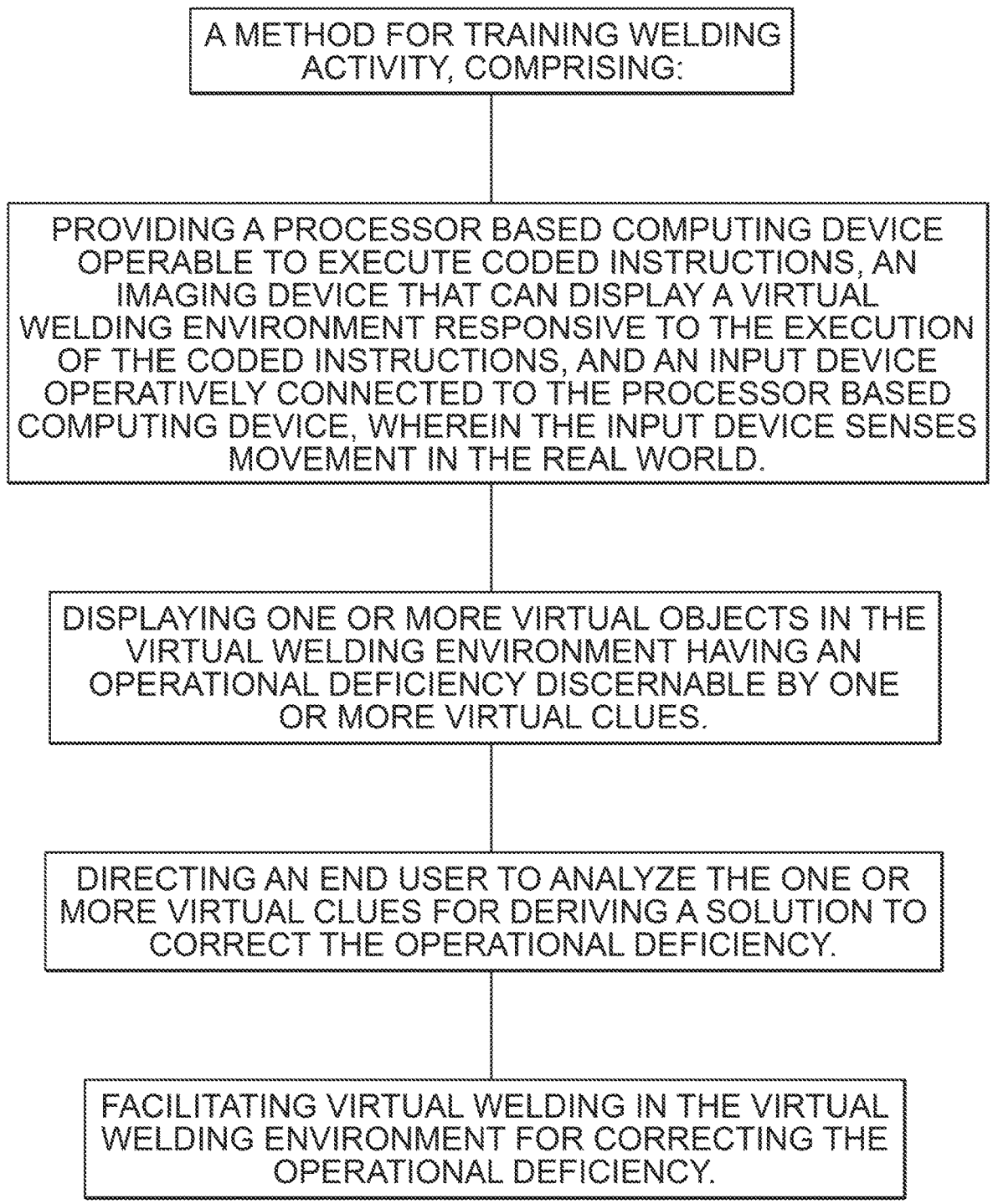
FIG. 7 is a block diagram depicting a method for training welding activity.

With reference now to FIG. 7, as mentioned above, the simulating device 10 may also comprise a system that facilitates training skills used in industrial or commercial settings. In one exemplary embodiment, the simulating device 10 may depict a virtual welding environment 9a featuring scenarios having one or more themed articles 16a consistent with that described above. The simulating device 10 may present the end user 11 with a problem to be solved, e.g. a building structure that needs assembled or a race car frame that needs repaired. The problem may be expressly stated whereby the end user 11 is directly tasked with solving the problem given a set of virtual tools 26. Instructions may be presented describing how the problem should be fixed including which welding techniques or processes should be used. The simulating device 10 may also indicate welder settings or ranges of settings that are needed to weld the virtual article(s) 16 for the given scenario. Additionally, the simulating device 10 may indicate what type of electrode is needed for a particular repair, and/or at what travel speed the weld should be made to make an acceptable virtual weld, which may correspond to a real world weld. However, any type of instruction may be presented to the end user 11 for assembling or repairing the virtual articles 16. It is once again noted that instructions may be displayed in text or audibly presented in any one of various languages, and/or graphically displayed with graphics as is appropriate for different training settings.

As the end user 11 advances, the level of instruction may be adjusted accordingly. At beginner levels, the level of instruction may focus on fundamentals relating to, for example, welding theory, basic welding practices and/or welder set up. Other training levels may provide tutorials related to various weld joint configurations and/or welding with different types of materials and electrodes. More advanced levels may concentrate on particular welding processes and techniques. Of course, each level may be enhanced by one or more scenarios simulating real world activity as described above.

In one embodiment, the welding training may include may be problem-based scenarios. The problem-based scenario may be characterized by incorporating an operational deficiency in a virtual article 16 that must be discovered, analyzed, and a solution formulated by the end user 11. Knowledge learned from a previous lesson or level of training may be relied on for solving the problem. In one example, a race car may be depicted and described as not functioning properly. The virtual environment 9a may be programmed to present visual, and/or audible, clues that allow the end user 11 to discern the particular problem presented for the given scenario. After analyzing the problem, the end user 11 is directed to devise a solution that, in an exemplary manner, may incorporate: selecting the appropriate welding process, adjusting the welding power supply settings, choosing a particular electrode and then performing a virtual weld. A proper repair therefore requires not only the physical motion of implementing a suitable virtual weld, but also selecting the appropriate welding process and associated parameters. A successful repair or assembly may be indicated, whereby the virtual race car drives away or drives in a race. If an improper or incomplete repair has been made, the race car may perform poorly or not at all with further clues provided to the end user 11 as to what problems remain that need to be fixed. In this manner, welding training encompasses not only the training of muscle memory to successfully perform a particular weld, but also teaches the end user 11 how to properly analyze the virtual article(s) 16 for selecting the appropriate welding process needed to correct its operational deficiency. Welding training may also encompass learning that extends beyond the training of muscle memory by incorporating weld puddle modeling that teaches the end user 11 to make adjustments during the welding process.

As mentioned above, a grade may be derived from the end user's analysis of the problem-based scenario. In one embodiment, the end user 11 may be given information regarding the virtual article's 16a base material and instructed to select an electrode appropriate for use with that base material. In the real world, selection of an electrode affects the integrity of a weld joint. Similarly selecting the right electrode in the virtual welding environment 9a affects the score or grade of the end user's 11 performance. Additionally, the end user 11 may be required to calculate the heat input to ensure that the base material properties are not permanently altered by multi-pass welds. In another embodiment, the simulating device 10 may provide the end user 11 with information related to material thickness and/or joint configuration. Accordingly, the end user 11 may be required to determine the appropriate travel speed for the virtual welding power supply settings selected in order to properly make the virtual weld. It is noted here that the information may be expressly stated or indicated by virtual cues from which the end user 11 may infer important factors needed for analyzing the problem. A combination of the aforementioned is also contemplated by the embodiments of the subject invention. It will be recognized that the simulating device 10 therefore functions to educate and evaluate proficiency in learning for science, technology, engineering and/or math as promoted by various educational and governmental institutions.

It may be required that each level of training must be satisfactorily completed before advancing to subsequent levels. In one embodiment, tests may be given related to both welding knowledge and/or virtual welding performance. Data, i.e. test data or performance data, from the current scenario may be tracked, stored and compared against preprogrammed welding parameters in a manner consistent with that described above. In areas where minimum levels of achievement have not been reached, the end user 11 may be given opportunity to review tutorials and/or practice welding a particular weld joint. Once proficiency has been demonstrated, the end user 11 may advance to progressively more difficult levels teaching new skills.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

The invention claimed is:
1. A game played on a processor based computing device executing coded instructions, comprising the steps of:
  providing processing means operable to execute coded instructions for generating an interactive virtual environment, wherein said processing means receives input from an associated input device;

creating a virtual article within virtual environment with an operational deficiency, said virtual article having an operational state that is changeable between operative and inoperative;

establishing a game objective to change the operational state of the virtual article by a virtual welding operation, said step of establishing further comprising at least the steps of analyzing the operational deficiency, selecting an appropriate welding process, adjusting the welding power supply settings, and choosing a particular electrode for performing said virtual welding operation;

directing an end user to perform one or more virtual welding operations, via manipulations of the associated input device, that change the operational state of the virtual article and wherein when the step of directing requires two or more virtual welding operations, each succeeding virtual weld is made using a progression of difficulty;

providing real-time quantitative feedback to the user related to one or more of a position and an orientation of the associated input device during the virtual welding operation as a result of the manipulations of the associated input device; and providing quantitative feedback on the position and orientation of the virtual welding operation by indicating guides to show at least the pitch and roll angles of a virtual welding torch within a range of acceptable values for said position and orientation, said feedback including providing feedback in which said indicating guides flash, change color or play an audible sound which indicates when said end user is outside said range of acceptable values for the virtual welding operation.

2. The game as defined in claim 1, further comprising the step of:
instantiating a virtual article with a operational state set to inoperative, wherein the virtual article is capable of functioning within the virtual environment when the operational state is changed to operative.

3. The game as defined in claim 2, further comprising the step of:
providing display means for displaying the virtual environment; and,
wherein when the operational state of the virtual article is changed to operative, said display means depicts the virtual article exhibiting activity related to its function.

4. The game as defined in claim 2, wherein the step of storing data representing virtual weld quality standards, comprises the step of:
storing ranges of data representing virtual weld quality standards that is derived from a virtual weld torch pitch angle or a virtual weld torch roll angle.

5. The game as defined in claim 1, further comprising the steps of:
storing data representing virtual weld quality standards;
capturing performance data of the virtual welding operation; and,
determining if the game objective has been accomplished by comparing performance data of the virtual welding operation with the data representing virtual weld quality standards.

6. The game as defined in claim 5, further comprising the step of:
ascribing a game score based on the performance data of the virtual welding operation.

7. The game as defined in claim 1, further comprising the steps of:
providing display means for displaying the interactive virtual environment, wherein the virtual environment is created from one of a plurality of scenarios;
presenting an option of selecting one of a plurality of scenarios from which the virtual environment will be created; and,
directing the end user to select one of a plurality of scenarios.

8. The game as defined in claim 1, wherein the game includes multiple levels of play differentiated by the number of virtual welding operations required to change the operational state of the virtual article.

9. The game as defined in claim 1, wherein the game includes multiple levels of play each differentiated by the complexity of the virtual welding operations.

10. A kit for an associated processor based computing device executing coded instructions for displaying an interactive virtual welding environment and having an associated input device for interfacing with an end user, comprising:
a readily releasable attachment adapted to fixedly connect to the associated input device, wherein the readily releasable attachment resembles a welding tool displayed in the interactive virtual welding environment;
at least one quantitative performance guide that displays a real-time feedback value related to a position and an orientation of the input device used in the virtual welding environment, wherein each performance guide indicates the position and orientation of said input device within a range of acceptable values for said position and orientation of said input device for an acceptable weld, said feedback including providing feedback in which said at least one quantitative performance guide flashes, changes color or plays an audible sound which indicates when said input device is outside said range of acceptable values for the virtual welding operation; and
a welding coupon that corresponds to a virtual article displayed in the interactive virtual welding environment for guiding the end user while interacting with the virtual welding environment via manipulations of the associated input device with respect to the welding coupon, said virtual article having an operational deficiency and an operational state that is changeable between operative and inoperative, said change from the inoperative to the operational state requiring at least the steps of analyzing the operational deficiency, selecting an appropriate welding process, adjusting the welding power supply settings, and choosing a particular electrode for performing said virtual welding operation.

11. The kit as defined in claim 10, wherein the readily releasable attachment resembles an arc welding torch.

12. The kit as defined in claim 10, wherein the readily releasable attachment has a shape and weight that corresponds to real world welding torch.

13. The kit as defined in claim 10, further comprising:
a welding coupon that corresponds to a virtual article displayed in the interactive virtual welding environment for guiding the end user while interacting with the virtual welding environment.

14. A system, comprising:
processor-based computing device associated with a display, the processor-based computing device being configured to execute computer-executable instructions to generate an interactive virtual welding environment output on the display, the virtual welding environment including a virtual article on which a virtual welding activity is performed;

an input device associated with the processor-based computing device, the input device comprising:

one or more sensors configured to detect spatial orientation and movement of the input device when manipulated by a user performing the virtual welding activity on the virtual article, and to generate a sensor output specifying the spatial orientation and movement of the input device; and means for communicating the sensor output to the processor-based computing device; and a physical welding coupon that corresponds to the virtual article displayed in the interactive virtual welding environment, the physical welding coupon guides the user with manipulating the input device to interact with the virtual article to perform the virtual welding activity in the interactive virtual welding environment, wherein, based on the sensor output communicated by the input device, the processor-based computing device displays a performance guide that indicates at least one of the spatial orientation or movement of the input device relative to a range of acceptable values corresponding to an acceptable weld, and wherein the virtual article has an operational deficiency discernable by one or more virtual clues, and wherein the processor-based computing device directs the user to perform one or more virtual welding operations that change an operational state of the virtual article from inoperative to operative, and wherein the virtual welding operations require at least two virtual welding operations having a progression of difficulty.

15. The system of claim 14, wherein the performance guide corresponds to a parameter of a plurality of parameters.

16. The system of claim 15, wherein the parameter is one of a pitch angle, a roll angle, travel speed, or work-to-tip distance.

17. The system of claim 15, wherein the processor-based computing device displays a plurality of performance guides respectively corresponding to respective parameters of the plurality of parameters.

18. The system of claim 14, wherein the processor-based computing device is further configured to simulate creation of a virtual weld bead on the virtual article during the virtual welding activity.

19. The system of claim 18, wherein the virtual weld bead is simulated based on the sensor output.

20. The system of claim 14, wherein the input device further comprises a housing shaped to resemble a real-world welding tool.

21. The system of claim 14, wherein the input device isfurther configured to accept an attachment releasably coupleable to a body of the input device, wherein the attachment mimics a shape and weight of a real-world welding tool.

22. A method for training welding activity, comprising:
providing a processor based computing device operable to execute coded instructions, an imaging device that can display a virtual welding environment responsive to the execution of the coded instructions, and an input device operatively connected to the processor based computing device, wherein the input device senses movement in the real world;

displaying one or more virtual objects in the virtual welding environment having an operational deficiency discernable by one or more virtual clues;

displaying at least one quantitative performance guide to provide a real- time feedback value related to one or more of a roll and a pitch of the input device used in the virtual welding environment, wherein each performance guide indicates the position and orientation of said input device within a range of acceptable values for said position and orientation of said input device for an acceptable weld, said at least one performance guide including feedback in which said at least one quantitative performance guide flashes, changes color or plays an audible sound which indicates when said input device is outside said range of acceptable values for the virtual welding operation;

directing an end user to analyze the one or more virtual clues for deriving a solution to correct the operational deficiency, said step of directing further comprising at least the steps of analyzing the operational deficiency. selecting an appropriate welding process. adjusting the welding power supply settings. and choosing a particular electrode for performing said virtual welding operation; and, directing an end user to perform one or more virtual welding operations that change the operational state of the virtual article and wherein when the step of directing requires two or more virtual welding operations, each succeeding virtual weld is made using a progression of difficulty.

23. The method as defined in claim 22, further comprising the step of:

depicting a plurality of virtual welding parameters on the imaging device that when changed defines a virtual welding process and wherein the plurality of virtual welding parameters are changeable by way of manipulating the input device; and wherein the step of deriving the solution to correct the operational deficiency includes changing at least one of the plurality of virtual welding parameters.

24. The method as defined in claim 22, wherein the step of facilitating virtual welding in the virtual welding environment results in a virtual weld, and further comprising the steps of:

storing data representing a threshold of virtual welding quality for the virtual weld; and, evaluating the virtual weld with respect to the threshold of virtual welding quality.

25. The method as defined in claim 22, wherein the step of displaying one or more virtual objects in the virtual welding environment having an operational deficiency discernable by one or more virtual clues comprises the step of:

displaying one or more virtual objects in a first scenario of the virtual welding environment having a first operational deficiency discernable by one or more virtual clues; and, further comprising the step of:

displaying one or more virtual objects in a second scenario of the virtual welding environment having a second substantially operational deficiency discernable by one or more virtual clues.

* * * * *